United States Patent
Kim et al.

(10) Patent No.: US 11,279,367 B2
(45) Date of Patent: Mar. 22, 2022

(54) VEHICLE CONTROL DEVICE PROVIDED IN VEHICLE AND VEHICLE CONTROL METHOD

(71) Applicant: LG Electronics Inc., Seoul (KR)

(72) Inventors: Sangwon Kim, Seoul (KR); Kyunglack Kim, Seoul (KR); Sangroc Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 259 days.

(21) Appl. No.: 16/625,484

(22) PCT Filed: Jun. 26, 2017

(86) PCT No.: PCT/KR2017/006705
§ 371 (c)(1),
(2) Date: Dec. 20, 2019

(87) PCT Pub. No.: WO2018/235979
PCT Pub. Date: Dec. 27, 2018

(65) Prior Publication Data
US 2021/0139036 A1    May 13, 2021

(30) Foreign Application Priority Data
Jun. 22, 2017    (KR) .................. 10-2017-0079271

(51) Int. Cl.
| | |
|---|---|
| *B60W 40/08* | (2012.01) |
| *B60W 60/00* | (2020.01) |
| *B60R 16/037* | (2006.01) |
| *G10L 15/22* | (2006.01) |

(52) U.S. Cl.
CPC ......... *B60W 40/08* (2013.01); *B60R 16/0373* (2013.01); *B60W 60/001* (2020.02); *B60W 60/0051* (2020.02); *G10L 15/22* (2013.01); *B60W 2040/089* (2013.01); *B60W 2420/54* (2013.01); *B60W 2540/21* (2020.02)

(58) Field of Classification Search
None
See application file for complete search history.

(56) References Cited

U.S. PATENT DOCUMENTS

| | | | |
|---|---|---|---|
| 2014/0297060 A1 | 10/2014 | Schmidt et al. | |
| 2016/0217795 A1* | 7/2016 | Lee | ......... G10L 17/06 |
| 2017/0151950 A1 | 6/2017 | Lien | |

FOREIGN PATENT DOCUMENTS

| | | | | |
|---|---|---|---|---|
| CN | 106601257 B | * | 5/2020 | ............. G10L 15/22 |
| DE | 102012022630 | | 6/2013 | |
| EP | 2806335 | | 11/2014 | |

(Continued)

OTHER PUBLICATIONS

EP Extended European Search Report in European Appln. No. 17914186.6, dated May 6, 2021, 5 pages.

*Primary Examiner* — Jelani A Smith
*Assistant Examiner* — Jacob Daniel Underbakke
(74) *Attorney, Agent, or Firm* — Fish & Richardson P.C.

(57) ABSTRACT

A vehicle control device is provided in a vehicle and includes a microphone, a first voice recognition engine, a second voice recognition engine different from the first voice recognition engine, and a processor for executing the first voice recognition engine or the second voice recognition engine on the basis of the vehicle traveling mode when a command is received through the microphone.

20 Claims, 22 Drawing Sheets

(56) References Cited

FOREIGN PATENT DOCUMENTS

| | | |
|---|---|---|
| EP | 3040985 | 7/2016 |
| JP | 07144556 | 6/1995 |
| KR | 1020130063091 | 6/2013 |
| KR | 1020160013720 | 2/2016 |
| KR | 1020160055162 | 5/2016 |
| KR | 1020160069308 | 6/2016 |
| KR | 1020160100640 | 8/2016 |
| KR | 101713770 | 3/2017 |

* cited by examiner

[AUTONOMOUS DRIVING MODE]

[MANUAL DRIVING MODE]

(a)

(b)

(c)

(a)

(b)

(a)

(b)

(c)

VEHICLE CONTROL DEVICE PROVIDED IN VEHICLE AND VEHICLE CONTROL METHOD

CROSS-REFERENCE TO RELATED APPLICATIONS

This application is the National Stage filing under 35 U.S.C. 371 of International Application No. PCT/KR2017/006705, filed on Jun. 26, 2017, which claims the benefit of earlier filing date and right of priority to Korean Application No. 10-2017-0079271, filed on Jun. 22, 2017, the contents of which are all hereby incorporated by reference herein in their entirety.

BACKGROUND

1. Technical Field

The present disclosure relates to a vehicle control device mounted on a vehicle and a control method of the vehicle.

2. Description of the Related Art

A vehicle is a device capable of being moved in a desired direction by a user who is on board. Typically, an automobile will be taken as an example.

Meanwhile, for convenience of a user using a vehicle, various types of sensors and electronic devices are provided in the vehicle. In particular, for the convenience of the user's driving, research on an advanced driver assistance system (ADAS) is being actively carried out. Furthermore, development of an autonomous vehicle is being actively carried out.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience and safety while driving a vehicle is required.

In addition, in recent years, as technology development related to voice recognition is actively carried out, the development of a method of controlling a vehicle through voice recognition has been actively carried out.

SUMMARY

An aspect of the present disclosure is to provide a vehicle control device and a vehicle control method capable of providing an optimized voice recognition function associated with a vehicle.

Another aspect of the present disclosure is to provide a vehicle control device and a vehicle control method capable of providing an optimized voice recognition function for each driving mode of a vehicle.

Still another aspect of the present disclosure is to provide a vehicle control device and a vehicle control method capable of using a plurality of voice recognition engines in an optimized method.

The problems of the present disclosure may not be limited to the above-mentioned problems, and other problems not mentioned herein may be clearly understood by those skilled in the art from the following description.

In order to achieve the foregoing objectives, a vehicle control device according to an embodiment of the present disclosure may include a microphone, a first voice recognition engine, a second voice recognition engine different from the first voice recognition engine, and a processor that executes either one of the first and second voice recognition engines based on the driving mode of a vehicle when a command is received through the microphone.

According to an embodiment, the processor may execute the first voice recognition engine in response to the received command when the driving mode of the vehicle is a manual driving mode, and execute the second voice recognition engine in response to the received command when the driving mode of the vehicle is an autonomous driving mode.

According to an embodiment, the first voice recognition engine and the second voice recognition engine may be set to have different control authorities for controlling the vehicle.

According to an embodiment, first voice recognition engine may be set with first control authority, and the second voice recognition engine may be set with second control authority that is greater than the first control authority.

According to an embodiment, the first voice recognition engine may be unable to perform control associated with the driving of the vehicle through the first control authority, and the second voice recognition engine may be able to perform control associated with the driving of the vehicle through the second control authority.

According to an embodiment, the processor may control the first and second voice recognition engines to have different functions executed by the first voice recognition engine and the second voice recognition engine for the same command received through the microphone.

According to an embodiment, the first voice recognition engine may execute a first function associated with a vehicle in response to the same command, and the second voice recognition engine may execute a second function associated with the vehicle that is different from the first function in response to the same command.

According to an embodiment, the processor may switch the driving mode of the vehicle from a manual driving mode to an autonomous driving mode when a command associated with the second voice recognition engine is received through the microphone while the first voice recognition engine is being executed.

According to an embodiment, the processor may activate the second voice recognition engine while a function associated with the driving of the vehicle among ADAS functions is carried out when the function associated with the driving of the vehicle is carried out in a state where the vehicle is driven in the manual driving mode.

According to an embodiment, the first voice recognition engine and the second voice recognition engine may output different guide information for the same function.

According to an embodiment, the vehicle control device may further include a communication unit, wherein when any unresponsive command in the first and second voice recognition engines is received through the microphone, the processor receives voice recognition information associated with the any command through the communication unit.

According to an embodiment, the processor may execute either one of the first and second voice recognition engines based on the type of the received the voice recognition information, and the executed voice recognition engine may output the received voice recognition information.

According to an embodiment, the processor may change the driving mode of the vehicle from a manual driving mode to an autonomous driving mode, and execute the second voice recognition engine to output the voice recognition information when voice recognition information that should be carried out by the second voice recognition engine is received while the driving mode of the vehicle is the manual driving mode.

According to an embodiment, when the voice recognition information is received, the processor may output the voice recognition information through either one of first and second voice recognition engines based on the driving mode of the vehicle.

A vehicle according to an embodiment of the present disclosure may include the vehicle control device described in the present specification.

A method of controlling a vehicle including the vehicle control device according to an embodiment of the present disclosure may include receiving a command through a microphone, and executing either one of a first voice recognition engine and a second voice recognition engine based on the driving mode of the vehicle when the command is received through the microphone.

Other details of embodiments are included in the detailed description and the drawings.

According to an embodiment of the present disclosure, there is one or more of the following effects.

First, the present disclosure may provide a new user interface capable of executing a different voice recognition engine for each driving mode of a vehicle, thereby controlling the vehicle in an optimized manner.

Second, the present disclosure may provide a new control method of a vehicle capable of switching the driving mode of the vehicle according to a voice recognition engine being executed among the plurality of voice recognition engines.

Third, the present disclosure may execute an optimized voice recognition engine according to a situation, and control a vehicle in an optimized manner through the voice recognition engine, thereby significantly improving the convenience of a driver.

The effects of the present disclosure may not be limited to the above-mentioned effects, and other effects not mentioned herein may be clearly understood by those skilled in the art from the description of the claims.

DETAILED DESCRIPTION OF THE EMBODIMENTS

Figure 1:
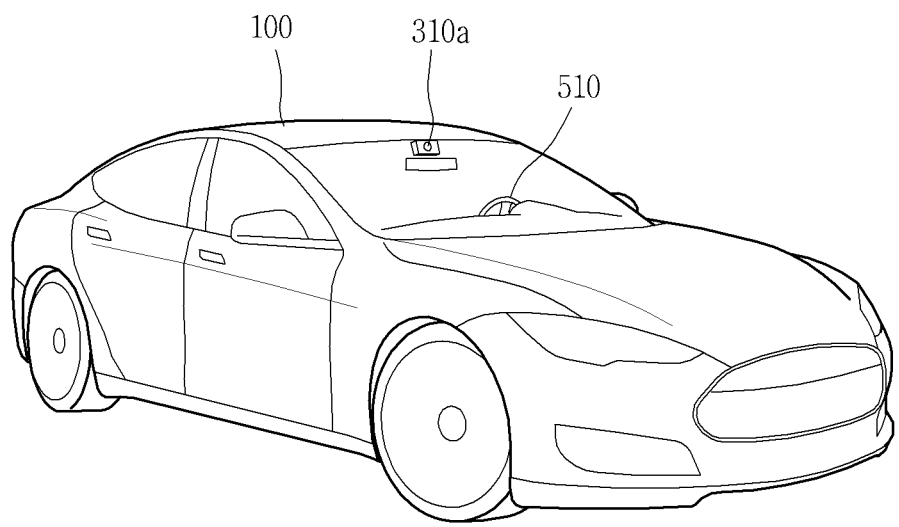
FIG. 1 is a view illustrating an appearance of a vehicle according to an embodiment of the present disclosure.
Figure 1:
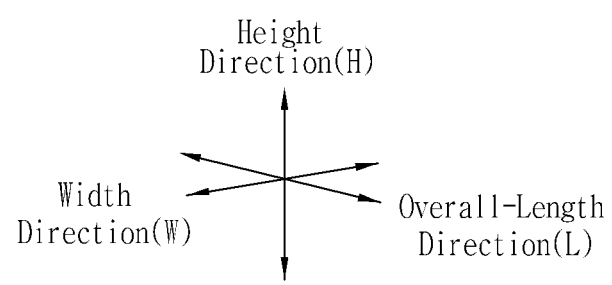

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is judged to obscure the gist of the present invention. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating an appearance of a vehicle according to an embodiment of the present disclosure.

Figure 2:
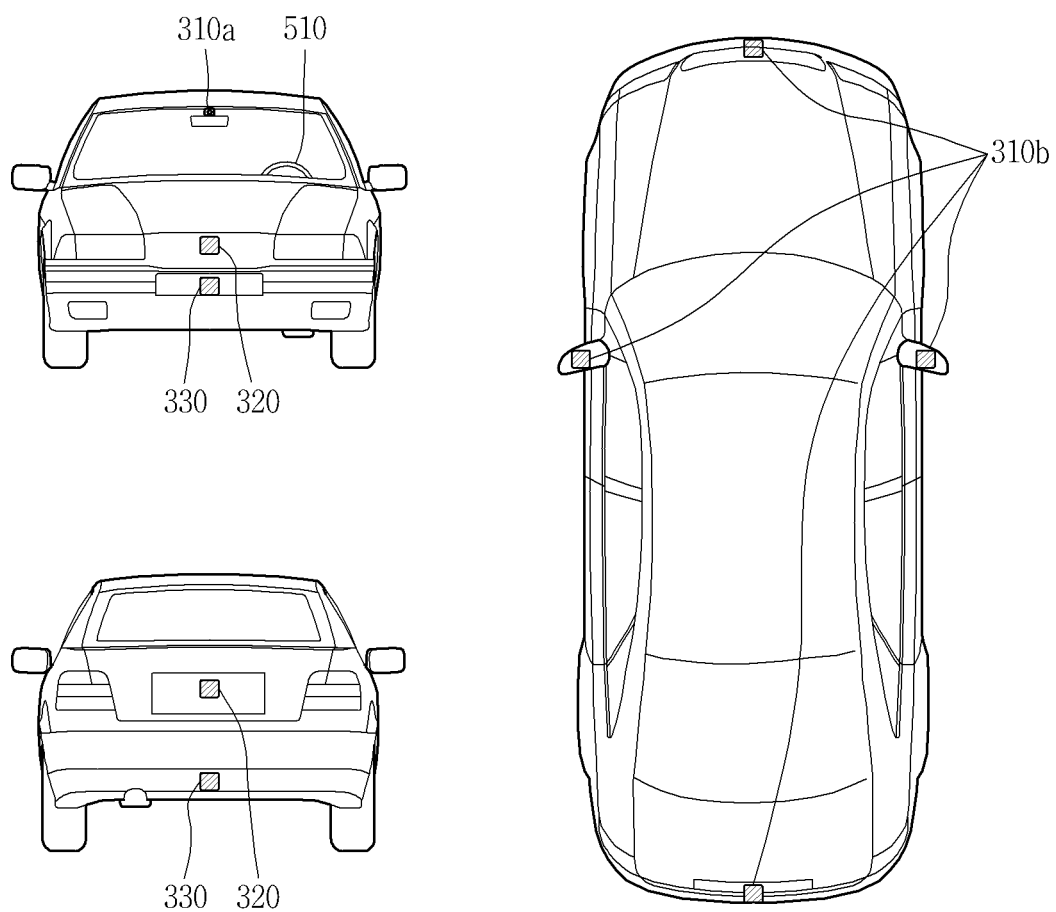
FIG. 2 is a view in which a vehicle according to an embodiment of the present disclosure is viewed at various angles from the outside.

FIG. 2 is a view in which a vehicle according to an embodiment of the present disclosure is viewed at various angles from the outside.

Figure 3:
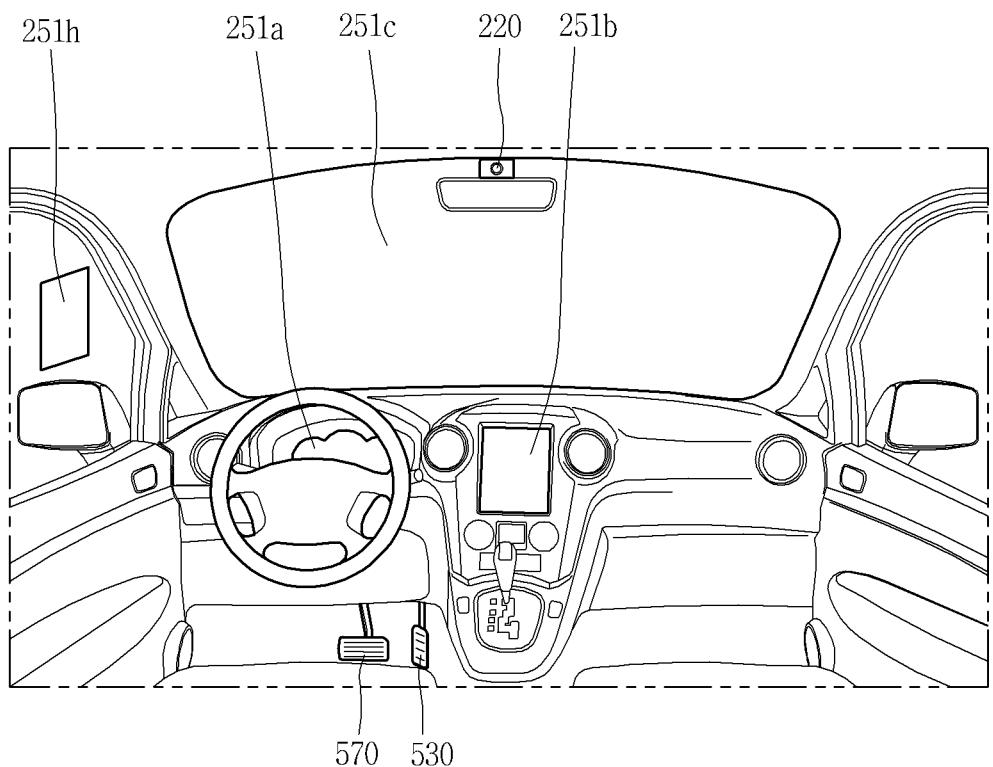
FIGS. 3 and 4 are views illustrating an inside of a vehicle according to an embodiment of the present disclosure.
Figure 4:
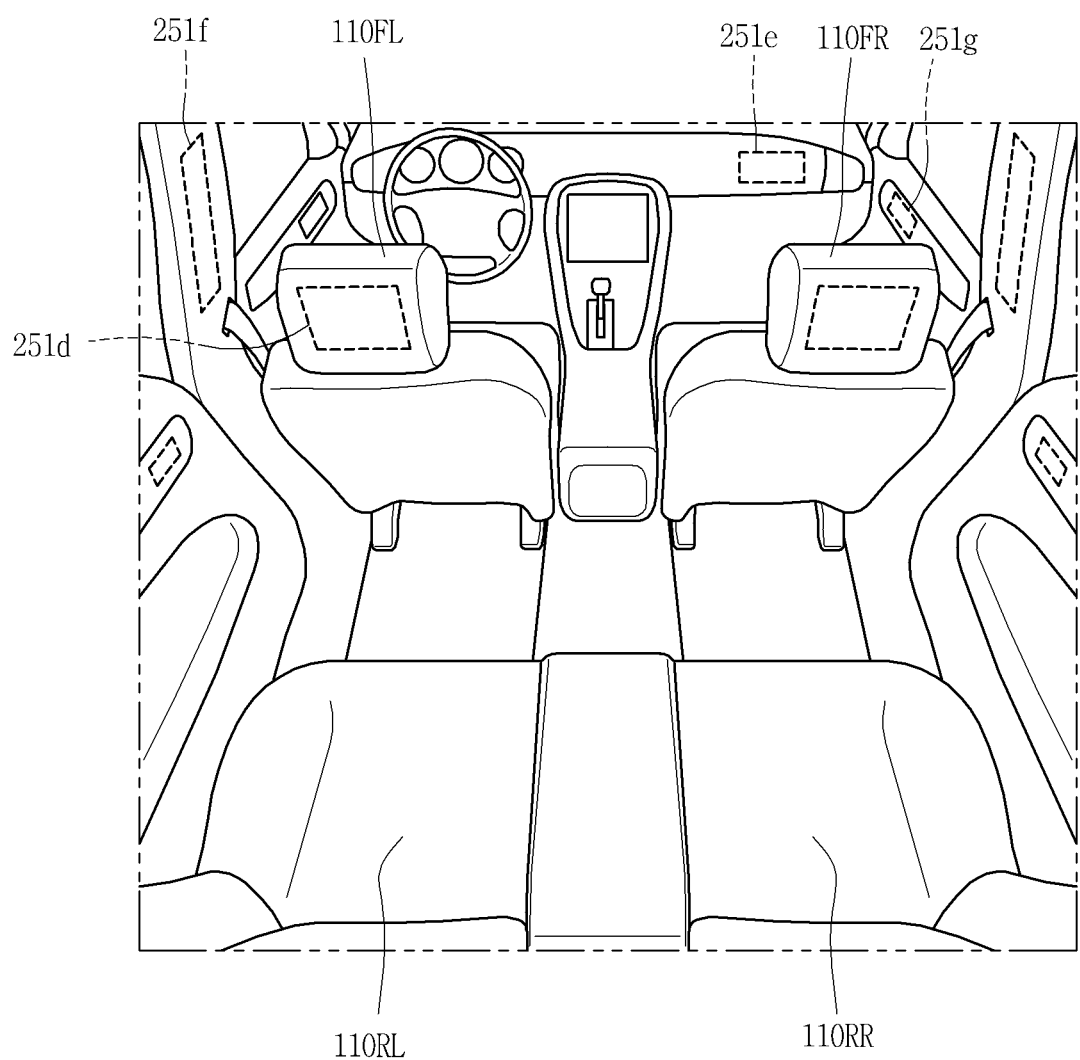

FIGS. 3 and 4 are views illustrating an inside of a vehicle according to an embodiment of the present disclosure.

Figure 5:
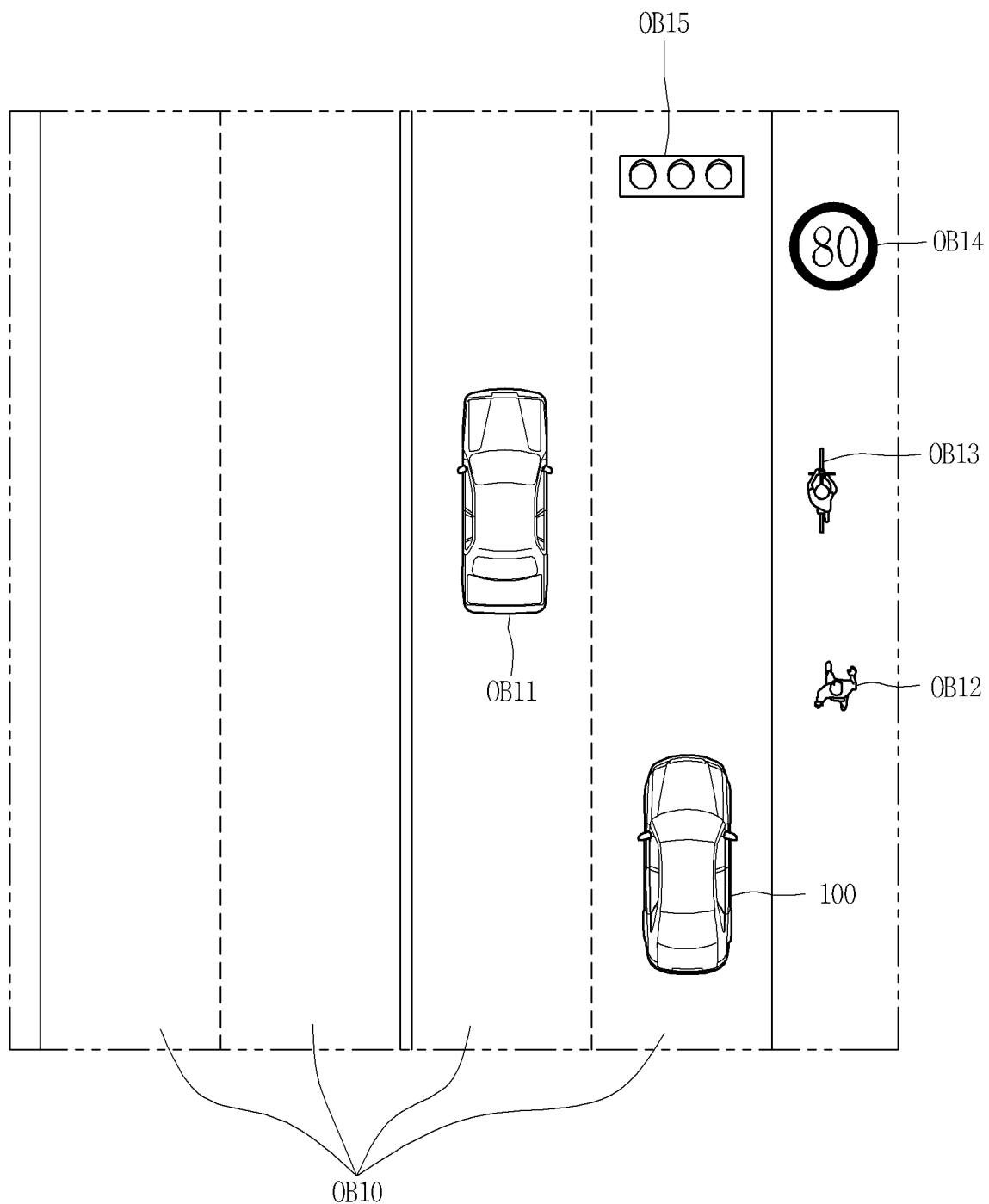
FIGS. 5 and 6 are views referenced to describe objects according to an embodiment of the present disclosure.
Figure 6:
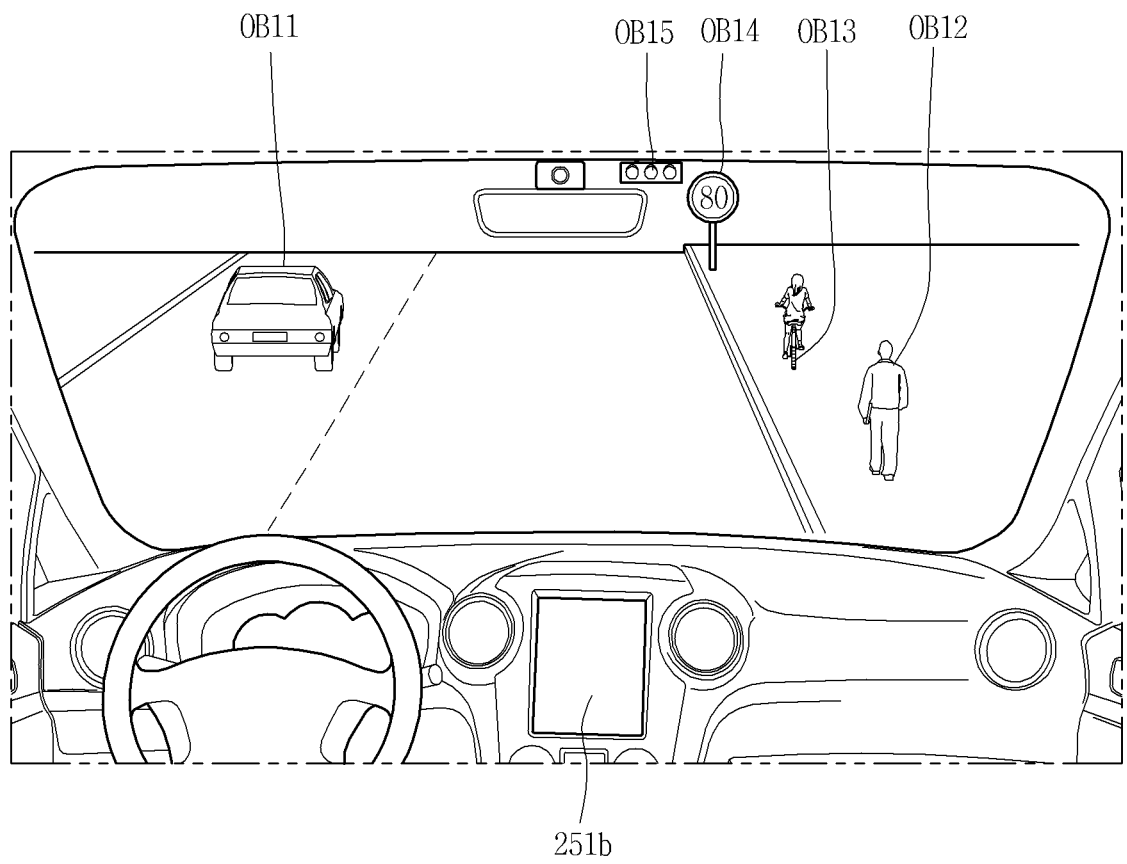

FIGS. 5 and 6 are views referenced to describe objects according to an embodiment of the present disclosure.

Figure 7:
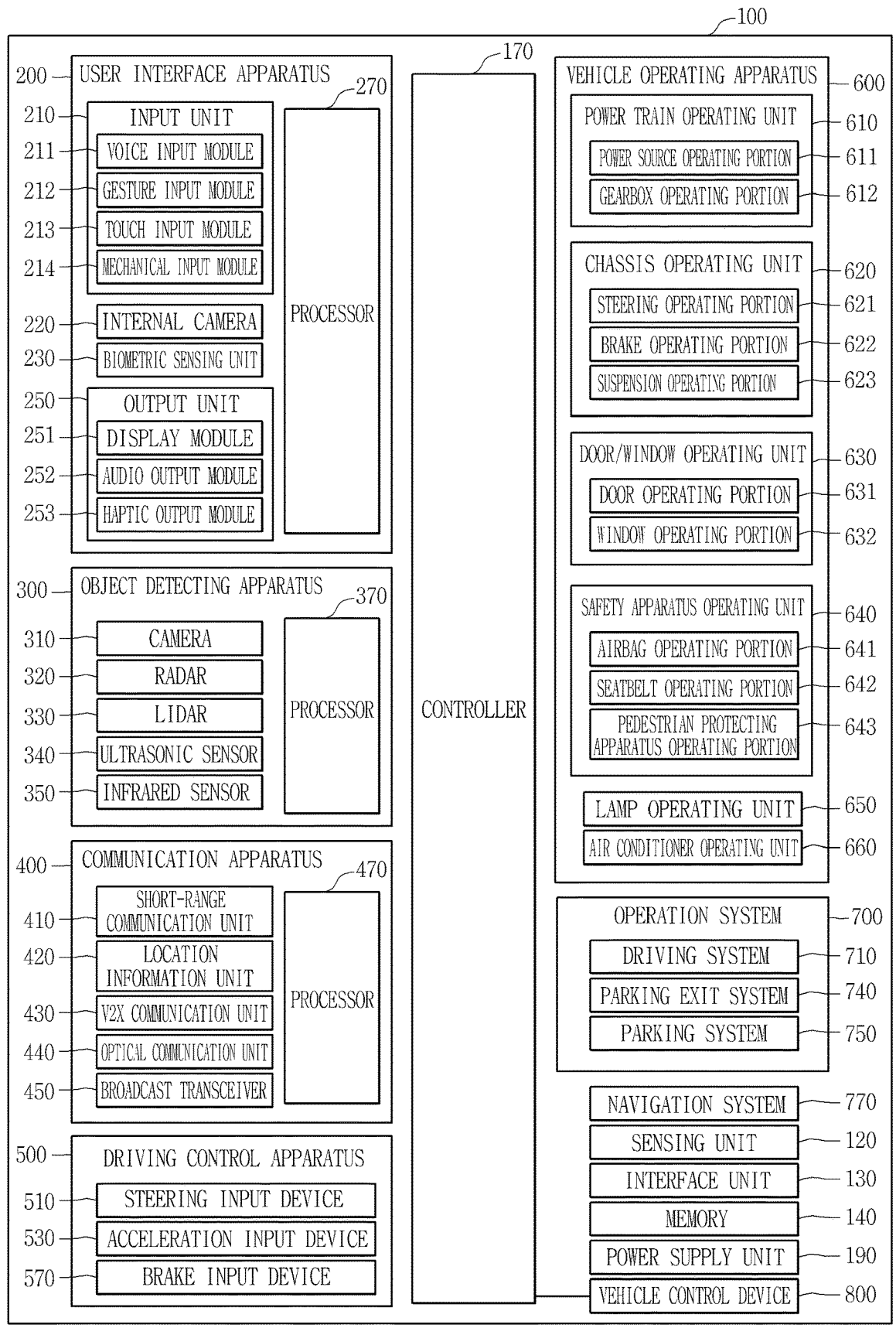
FIG. 7 is a block diagram referenced to describe a vehicle according to an embodiment of the present disclosure.

FIG. 7 is a block diagram referenced to describe a vehicle according to an embodiment of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a lidar 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle.

The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time of flight (TOF) manner or a phase-shift manner through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (vehicle to infrastructure; V2I), another vehicle (vehicle to vehicle; V2V), or a pedestrian (vehicle to pedestrian; V2P). The V2X communication unit 430 may include an RF circuit capable of implementing a communication protocol with an infrastructure (V2I), a communication protocol between vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

Meanwhile, according to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. In other words, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one embodiment of the present disclosure, with reference to the accompanying drawings.

Figure 8:
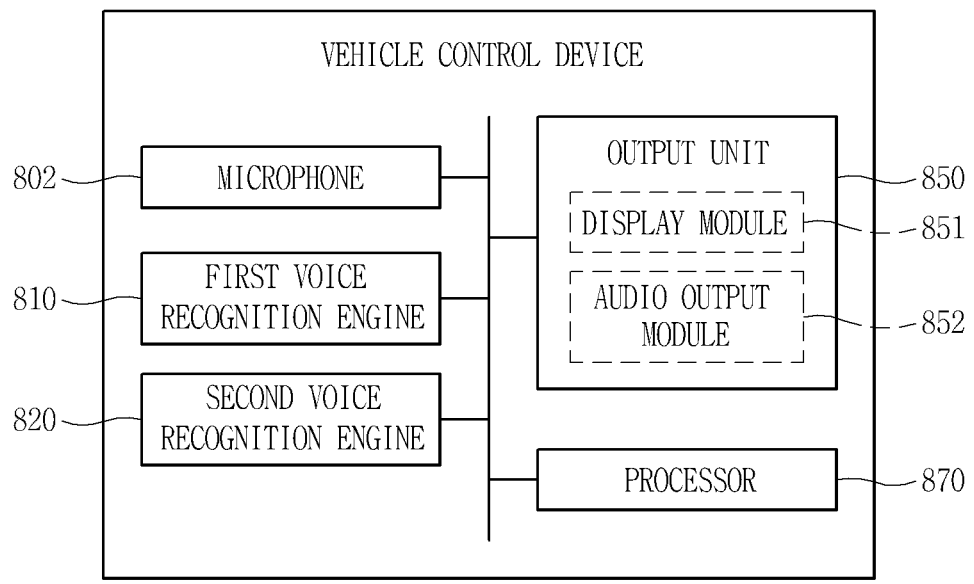
FIG. 8 is a conceptual view for explaining a vehicle control device according to an embodiment of the present disclosure.

FIG. 8 is a conceptual view for explaining a vehicle control device according to an embodiment of the present disclosure.

Referring to FIG. 8, the vehicle control device 800 according to the present disclosure may include a microphone 802, a first voice recognition engine 810, a second voice recognition engine 820, an output unit 850, a processor 870, and the like.

First, the vehicle control device 800 associated with the present disclosure may include the microphone 802.

The microphone 802 may be an input device for receiving sound. For an example, the microphone 802 may be the voice input unit 211 of the input module 210 described with reference to FIG. 7.

The microphone 802 may convert a user's voice input into an electric signal. The converted electric signal may be provided to the processor.

The microphone 802 may be provided inside the vehicle, and may be defined in a protruding shape or may be incorporated into any one portion thereof.

Upon receiving a command from the user, the microphone 802 may transmit voice information corresponding to the command to the processor 870.

Meanwhile, the vehicle control device 800 according to the present disclosure may include a first voice recognition engine 810 and a second voice recognition engine 820 different from the first voice recognition engine.

The first and second voice recognition engines 810, 820 may be configured to execute a function corresponding to a command received from the user.

The first voice recognition engine 810 and the second voice recognition engine 820 may be independent of each other. For an example, the first voice recognition engine 810 and the second voice recognition engine 820 may be defined as independent modules.

In addition, the first voice recognition engine 810 and the second voice recognition engine 820 may be implemented by different algorithms. For example, functions, guide messages, control methods, and the like, which are executed in the first voice recognition engine 810 and the second voice recognition engine 820, may be differently carried out even when the same command is received.

The first voice recognition engine 810 and the second voice recognition engine 820 may be included in the processor 870 or may be separately provided from the processor 870.

When the first voice recognition engine 810 and the second voice recognition engine 820 are included in the processor 870, the first voice recognition engine 810 and the second voice recognition engine 820 may be defined in the form of components (or may be blocked).

Meanwhile, the first voice recognition engine 810 and the second voice recognition engine 820 may be provided in different devices. For example, the first voice recognition engine 810 may be provided in a mobile terminal connected through the communication apparatus 400, and the second voice recognition engine 820 may be provided in the vehicle control device 800.

Even when either one of the first voice recognition engine 810 and the second voice recognition engine 820 is provided in a device (mobile terminal) different from the vehicle control device 800, the processor 870 may control the either one of the two voice recognition engines provided in the different device.

Hereinafter, a case in which the first and second voice recognition engines 810, 820 are included in the vehicle control device 800 will be described as an example. However, the description thereof will be analogically applied to a case where either one of the first and second voice recognition engines 810, 820 is provided in a device (e.g., a mobile terminal) different from the vehicle control device 800 in the same or similar manner.

On the other hand, the vehicle control device 800 associated with the present disclosure may include the output unit 850.

The output unit 850 may be the output unit 250 illustrated in FIG. 7.

The output unit 850 may include a display module 851 and a sound output module 852.

Furthermore, the vehicle control device 800 associated with the present disclosure may include the display module 851.

The display module 851 included in the vehicle control device 800 associated with the present disclosure may be the display module 251 described above as a display apparatus provided in the vehicle 100.

The display module 851 may be the output unit 250 or the display module 251 illustrated in FIG. 7. Furthermore, the display module 851 may include an output unit (e.g., a touch screen) of a mobile terminal that is communicable with the communication apparatus 400.

The display module 851 may include a transparent display. The transparent display may be attached to the windshield or the window.

The display module 851 may be disposed on one area of a steering wheel, one area 251a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

For example, the display module 851 may include a cluster, a center information display (CID), a navigation device, and a head-up display (HUD), and the like.

The display module 851 may be inter-layered or integrated with a touch sensor to implement a touch screen. The touch screen functions as an input unit 210 that provides an input interface between the vehicle 100 (or vehicle control device 800) and the user, and at the same time, provides an output interface between the vehicle 100 (or vehicle control device 800) and the user.

The processor 870 may display various information related to the vehicle on the display module 851. In addition, the processor 870 may display information related to the vehicle on a different position of the display module 851 according to a type of the information related to the vehicle.

Various information displayed on the display module 851 will be described later in detail with reference to the accompanying drawings.

The display module 851 may be a navigation system 770 (or a navigation device). Furthermore, the display module 851 may include the navigation system 770.

In other words, the display module 851 may denote a navigation device provided in the vehicle 100, and the navigation device may be integrated into the vehicle 100 from the shipment of the vehicle 100 or may be a navigation device mounted by the user.

The display module 851 may denote a navigation system for a vehicle, and may denote a navigation system independent of the navigation system provided in the mobile terminal 900.

The description of the display module 851 in this specification may be applied to the navigation system 770, the navigation apparatus or the vehicle navigation system in the same or similar analogy.

The audio output module 852 may be the audio output module 252 illustrated in FIG. 7. The sound output module 252 is an output device that outputs sound, and may be a speaker, for an example.

The sound output module 852 may output a notification sound, a guide message, a sound of media content, and the like, which are output from the voice recognition engine under the control of the processor 870.

Outputting some information through the output unit 850 described herein may include any one of displaying the some information on the display module 851 or outputting the some information as a sound through the audio output module 852.

In addition, the vehicle control device 800 of the present disclosure may include the processor 870 capable of controlling the microphone 802, the first voice recognition engine 810, the second voice recognition engine 820, the output unit 850, and the like.

The processor 870 may be the controller 170 described with reference to FIG. 7.

The processor 870 may control the constituent elements described in FIG. 7 and the constituent elements described in FIG. 8.

The processor 870 may use the independent first and second voice recognition engines in different ways according to various conditions of the vehicle.

For example, when a command is received through the microphone 802, the processor 870 may recognize one of the first and second voice recognition engines 810, 820 based on the driving mode of the vehicle.

Hereinafter, a method of controlling the first and second voice recognition engines in an optimized manner according to the state of the vehicle in the present disclosure will be described in more detail with reference to the accompanying drawings.

Figure 9:
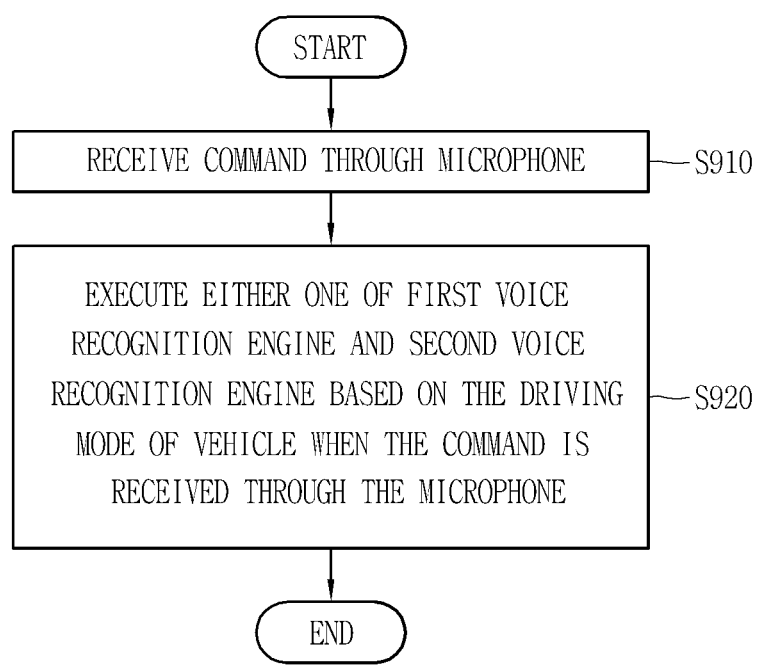
FIG. 9 is a flowchart for explaining a representative control method of the present disclosure.

FIG. 9 is a flowchart for explaining a representative control method of the present disclosure, and FIGS. 10, 11, 12A, 12B, 13, 14, 15, 16, 17, 18, 19, 20, 21 and 22 are conceptual views for explaining a control method described with reference to FIG. 9.

First, referring to FIG. 9, according to the present disclosure, the process of receiving a command through a microphone is carried out (S910).

The processor 870 may activate the microphone 802 according to a preset condition. For example, the preset condition may include a case where the user is in a vehicle, a case where the vehicle is started, a case where the vehicle is driving, a case where there is a user input, or a case where the surrounding situation of the vehicle is a preset situation (e.g., a case where there is a specific weather condition, a case where the possibility of collision of the vehicle is above a preset value, an event (e.g., an accident, construction, etc.) occurs within a predetermined distance from the vehicle, and the like.

The processor 870 may receive the user' voice received through the microphone 802.

The command (or command information) may denote a voice capable of operating at least one of the first voice recognition engine 810 and the second voice recognition engine 820 among the user's voices.

The command may not only have the form of words and sentences, but also include a specific sound (e.g., applause).

The processor 870 may extract a command from the user's voice received through the microphone 802.

For example, the processor 870 may convert a user's voice received through the microphone 802 into text through a speech-to-text (STT) conversion function that converts the received user's voice into text, and extract the command using the text.

The processor 870 may perform a function associated with the command, based on the extracted command.

Information on the command and the function associated with each command may be stored in the memory 140 or received from an external server through the communication apparatus 400.

In addition, the processor 870 may perform a text-to-speech (TTS) function for outputting text information generated by the first and second voice recognition engines 810, 820 as a voice.

Then, in the present disclosure, when a command is received through the microphone, the process of executing either one of the first voice recognition engine and the second voice recognition engine based on the driving mode of the vehicle is carried out (S920).

As described above, the first voice recognition engine 810 and the second voice recognition engine 820 may be independent of each other. For an example, the first voice recognition engine 810 and the second voice recognition engine 820 may be defined as independent modules.

The first voice recognition engine 810 may be different from the second voice recognition engine 820. For example, the first voice recognition engine 810 and the second voice recognition engine 820 may be implemented by different algorithms. Accordingly, functions, guide messages, control methods, and the like, which are executed in the first voice recognition engine 810 and the second voice recognition engine 820, may be differently carried out even when the same command is received.

The first voice recognition engine 810 and the second voice recognition engine 820 may be included in the processor 870 or may be separately provided from the processor 870.

When the first voice recognition engine 810 and the second voice recognition engine 820 are included in the processor 870, the first voice recognition engine 810 and the second voice recognition engine 820 may be defined in the form of components (or may be blocked).

Meanwhile, the first voice recognition engine 810 and the second voice recognition engine 820 may be provided in different devices. For example, the first voice recognition engine 810 may be provided in a mobile terminal connected through the communication apparatus 400, and the second voice recognition engine 820 may be provided in the vehicle control device 800.

Even when either one of the first voice recognition engine 810 and the second voice recognition engine 820 is provided in a device (mobile terminal) different from the vehicle control device 800, the processor 870 may control the either one of the two voice recognition engines provided in the different device.

In addition, each of the first voice recognition engine 810 and the second voice recognition engine 820 may be provided with its own processor (or MCU). In this case, the first voice recognition engine 810 and the second voice recognition engine 820 independently execute their own functions (operations, controls, etc.), or may control their own functions under the control of the processor 870.

When a command is received through the microphone 802, the processor 870 may determine whether to executes the first voice recognition engine 810 or the second voice recognition engine 820 based on the driving mode of the vehicle.

For example, the command may be a command capable of switching the first voice recognition engine 810 and the second voice recognition engine 820 from an inactive state to an active state.

The vehicle 100 associated with the present disclosure may operate in either one of a manual driving mode and an autonomous driving mode. Specifically, the processor 870 may drive the vehicle 100 in either one of a manual driving mode and an autonomous driving mode.

In other words, the driving mode of the vehicle 100 may include a manual driving mode and an autonomous driving mode.

The autonomous driving mode (or automatic driving mode) may refer to a mode in which the vehicle drives on its own based on a preset algorithm, regardless of the driver's driving operation. For an example, the autonomous driving mode may be a mode in which the vehicle may drive (run) on its own in a predetermined section or in at least part of a section to a destination set by the user.

In the autonomous driving mode, even when there is a driver's driving operation, the vehicle may be driven according to a preset algorithm to perform autonomous driving without changing the steering or speed of the vehicle.

The manual driving mode and the autonomous driving mode belong to a general technical field, and thus more detailed description thereof will be omitted.

Figure 10:
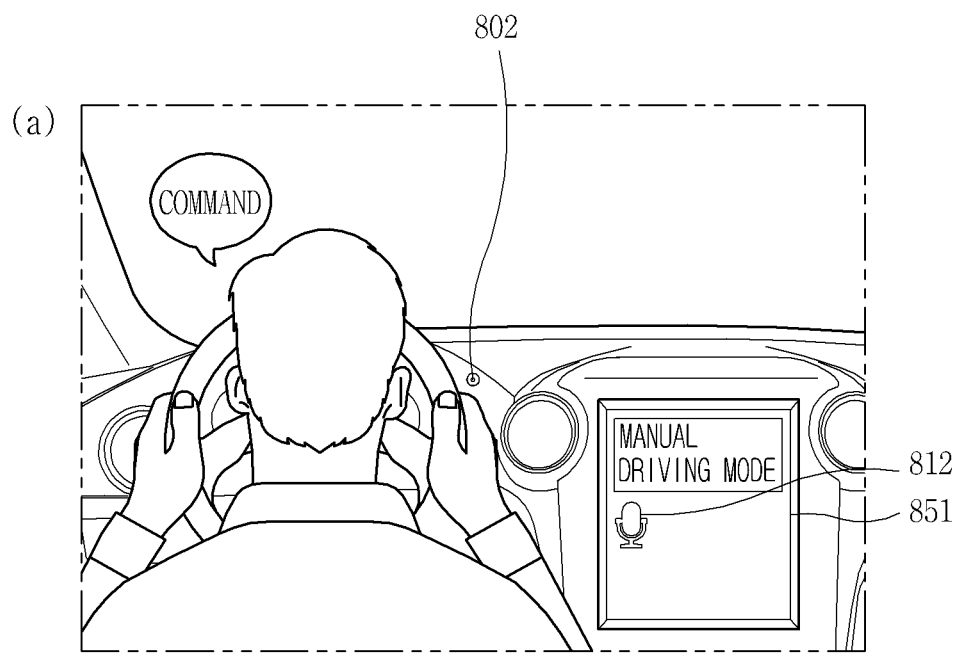
FIGS. 10, 11, 12A, 12B, 13, 14, 15, 16, 17, 18, 19, 20, 21 and 22 are conceptual views for explaining a control method described with reference to FIG. 9.
Figure 10:
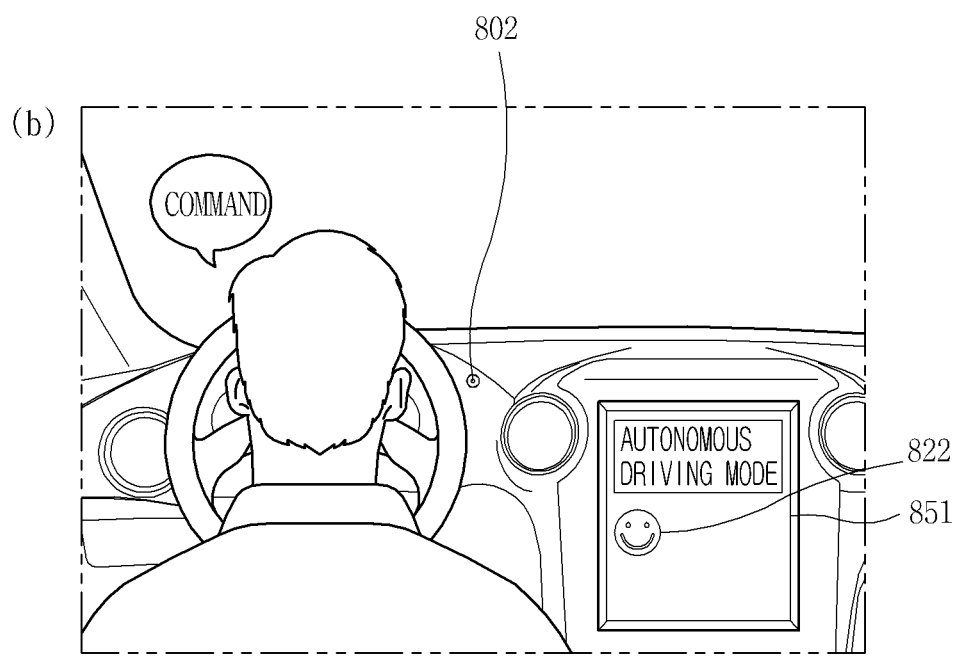

As illustrated in (a) in FIG. 10, when the driving mode of the vehicle is the manual driving mode, the processor 870 may execute the first voice recognition engine 810 in response to the received command.

In this case, a first graphic object 812 corresponding to the first voice recognition engine 810 may be displayed on the display module 851. The first graphic object 812 may serve to inform a user aboard the vehicle that the first voice recognition engine 810 is being executed (activated).

As illustrated in (b) in FIG. 10, when the driving mode of the vehicle is the autonomous driving mode, the processor 870 may execute the second voice recognition engine 820 in response to the received command.

At this time, a second graphic object 822 corresponding to the second voice recognition engine 820 may be displayed on the display module 851. The second graphic object 822 may have a different shape to be distinguished from the first graphic object 812.

In addition, the second graphic object 822 may serve to inform a user aboard the vehicle that the second voice recognition engine 820 is being executed (activated).

As described above, the present disclosure may provide a new user interface capable of executing a different voice recognition engine for each driving mode of the vehicle.

On the other hand, the first voice recognition engine 810 and the second voice recognition engine 820 may have different functions that can be carried out.

Specifically, the first voice recognition engine 810 and the second voice recognition engine 820 may be set to have different control authorities for controlling the vehicle 100.

Figure 11:
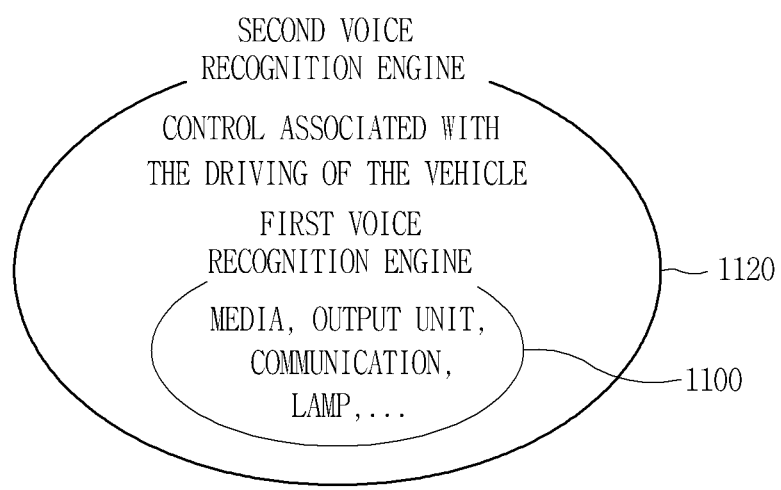

For example, referring to FIG. 11, first control authority 1100 may be set to the first voice recognition engine 810.

In addition, second control authority 1120 that is greater than the first control authority 1100 may be set to the second voice recognition engine 820. Specifically, as illustrated in FIG. 11, the second control authority 1120 may include the first control authority 1100.

In other words, a function that can be carried out by the first control authority 1100 may also be carried out by the second control authority 1120. On the other hand, some of the functions that can be carried out by the second control authority 1120 may not be carried by the first control authority 1100.

The functions that can be carried out by the first control authority 1100 may be, for example, functions that are not related to the driving of the vehicle. For example, in the present disclosure, the output of media, the control of the output unit, the control of a lamp provided in the vehicle, the control of the communication apparatus, and the like may be carried out through the first control authority.

On the other hand, the second control authority 1120 may perform all the functions that can be carried out by the first control authority 1100. In addition, a function that can be carried out only through the second control authority 1120 may be, for example, control related to the driving of the vehicle.

The control related to the driving of the vehicle may include controlling functions related to the movement of the vehicle, for example, starting the vehicle, changing the steering angle of the vehicle, changing the speed of the vehicle, and the like.

In other words, the first control authority 1100 may be set (granted) to the first voice recognition engine 810. Accordingly, the first voice recognition engine 810 is unable to control the driving of the vehicle with the first control authority.

On the other hand, the second control authority 1120 including the first control authority 1100 may be set (granted) to the second voice recognition engine 820. In addition, the second control authority may be set to execute control related to the driving of the vehicle.

Accordingly, the second voice recognition engine 820 may be defined to enable control related to the driving of the vehicle through the second control authority 1120.

Any function/operation/control carried out by the first and second voice recognition engines 810, 820 may be understood that any function/operation/control is carried out by the first and second voice recognition engines 810, 820 under the control of the processor 870.

In summary, first control authority that is unable to perform control associated with the driving of the vehicle may be set to the first voice recognition engine 810 of the present disclosure. In the manual driving mode, control relating to the driving of the vehicle can be made may be carried out by the driver (or by the driver's driving operation).

Accordingly, when a command is received through the microphone 802 while the driving mode of the vehicle is the manual driving mode, the processor 870 may execute the first voice recognition engine 810.

In addition, second control authority capable of controlling the driving of the vehicle may be set to the second voice recognition engine 820 of the present disclosure. In the autonomous driving mode, control related to driving of the vehicle may be carried out by the processor 870 rather than the driver.

Accordingly, when a command is received through the microphone 802 while the driving mode of the vehicle is the autonomous driving mode, the processor 870 may execute the second voice recognition engine 820.

As described above, the present disclosure may provide a new user interface capable of selectively executing a plurality of voice recognition engines having different control authorities according to the driving mode of the vehicle.

Meanwhile, the vehicle control device 800 of the present disclosure may provide a first voice recognition engine and a second voice recognition engine that execute different functions for the same command.

The processor 870 may control the first voice recognition engine 810 and the second voice recognition engine 820 to perform different functions for the same command received through the microphone 802.

In detail, the first voice recognition engine 810 may execute a first function associated with the vehicle in response to the same command. In addition, the second voice recognition engine 820 may execute a second function associated with the vehicle different from the first function in response to the same command.

Figure 12A:
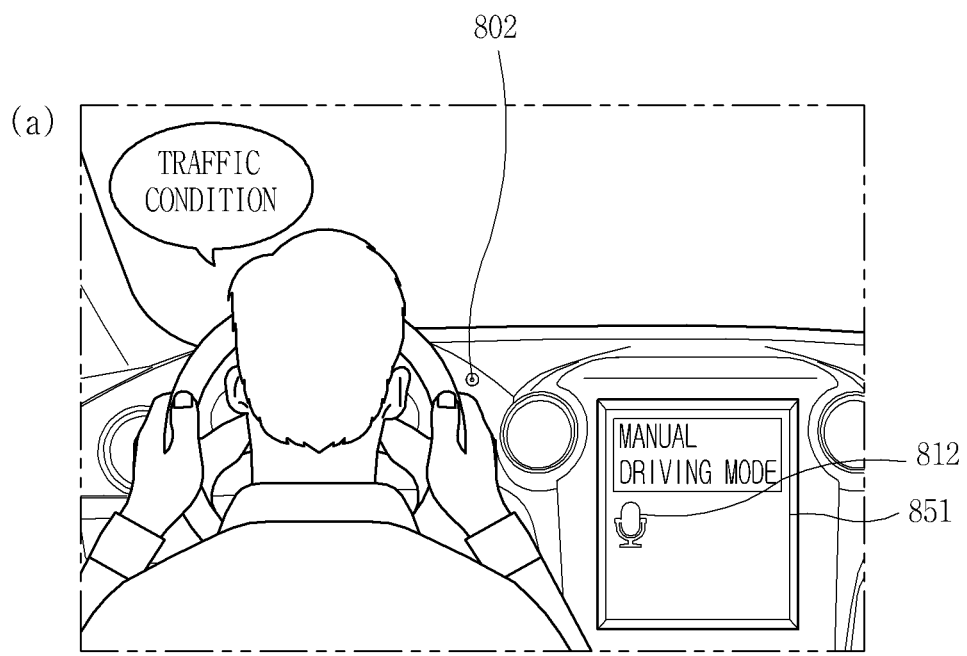
Figure 12A:
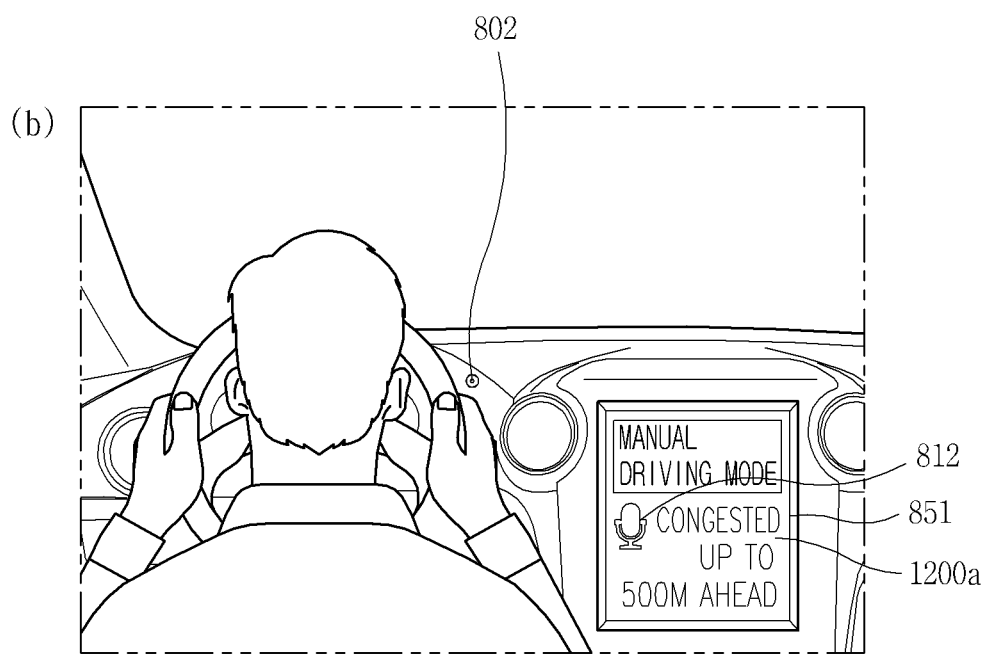

For example, as illustrated in (a) of FIG. 12A, when the driving mode of the vehicle is the manual driving mode, the first voice recognition engine 810 may be being executed.

At this time, when a same command (specific command) (e.g., a traffic condition) is received through the microphone 802, the processor 870 may execute a first function associated with the vehicle (e.g., a function 1200*a* for guiding the traffic condition) in response to the same command (specific command) as illustrated in (b) of FIG. 12A.

Figure 12B:
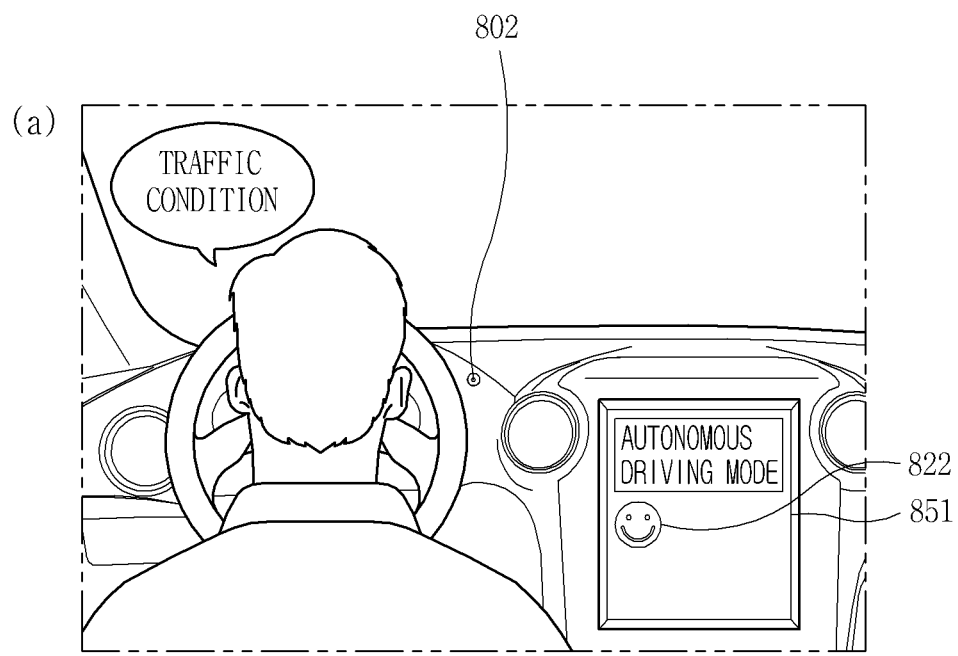
Figure 12B:
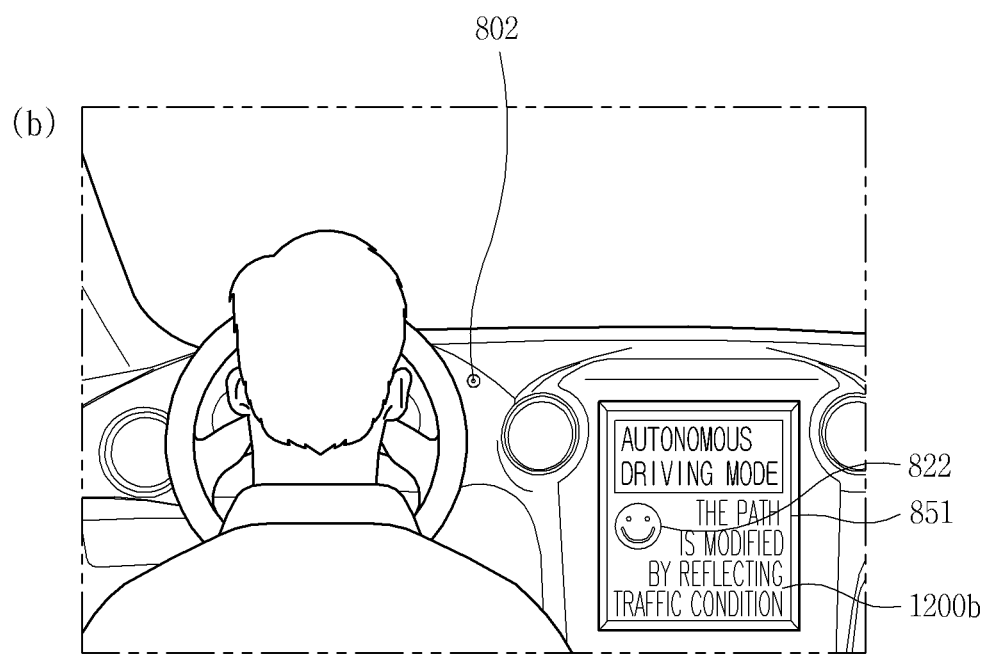

For another example, as illustrated in (a) of FIG. 12B, when the driving mode of the vehicle is the autonomous driving mode, the second voice recognition engine 820 may be being executed.

At this time, when the same command (the specific command) (e.g., a traffic condition) is received through the microphone 802, the processor 870 may execute a second function associated with the vehicle (e.g., a path information change function 1200*b* reflecting the traffic condition) in response to the same command (specific command) as illustrated in (b) of FIG. 12B.

In other words, different functions may be associated with the same command in the first voice recognition engine and the second voice recognition engine associated with the present disclosure.

Accordingly, the present disclosure may execute different functions according to the type of the voice recognition engine being executed (or the driving mode of the vehicle) even when the same command is received, thereby providing a vehicle control apparatus and a vehicle control method capable of providing an optimized function.

On the other hand, the vehicle control device 800 according to the present disclosure may be able to switch the driving mode of the vehicle through a command.

The processor 870 may receive a command associated with the second voice recognition engine through the microphone 802 while the first voice recognition engine 810 is being executed. For example, the first voice recognition engine 810 that is being executed may denote that the driving mode of the vehicle is the manual driving mode.

The command associated with the second voice recognition engine may include a command for activating the second voice recognition engine, a command associated with a function that can be carried out only by the second voice recognition engine, or a command for switching a voice recognition engine being executed from the first voice recognition engine to the second voice recognition engine.

Figure 13:
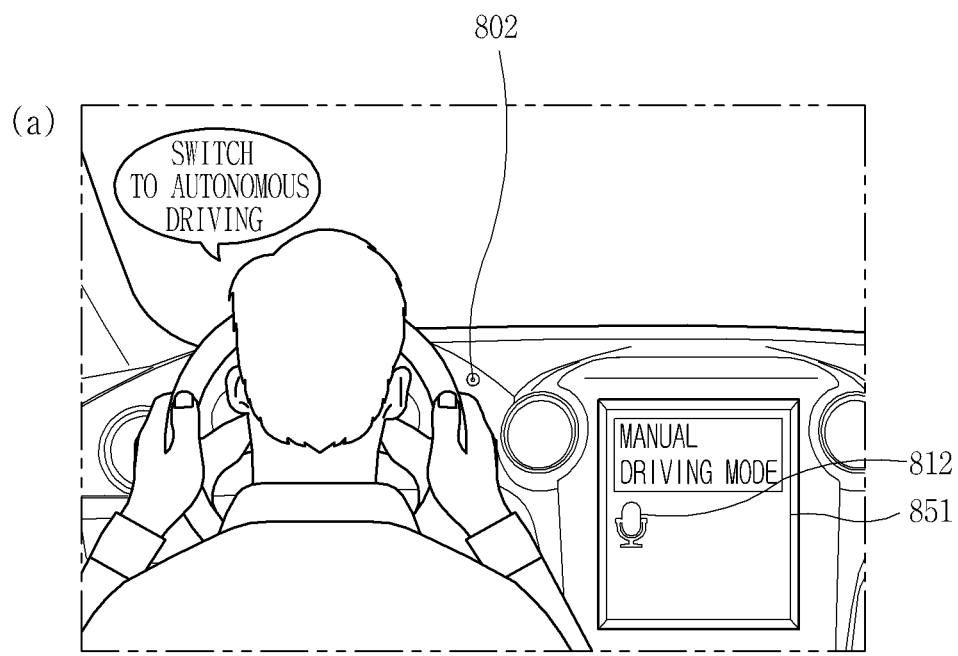
Figure 13:
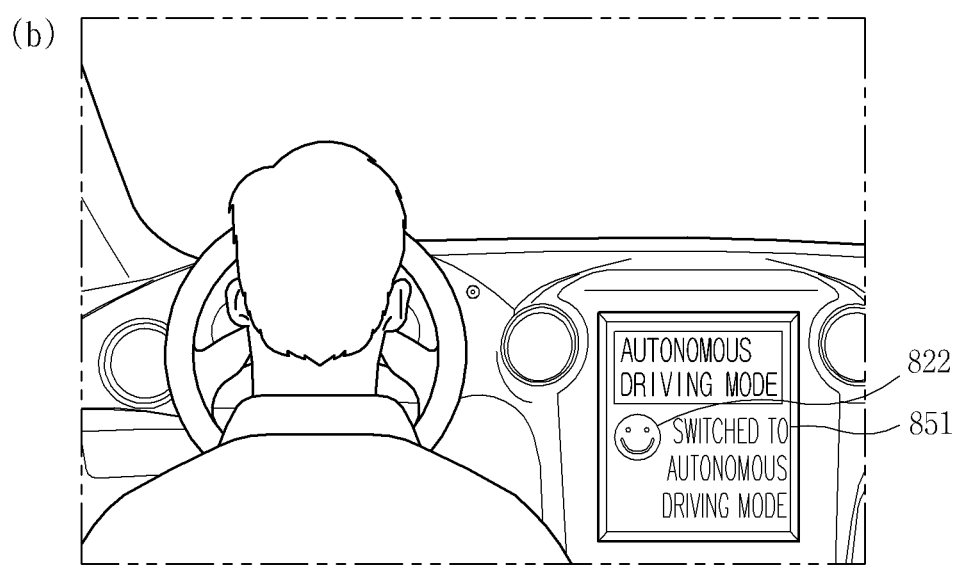

As illustrated in (a) of FIG. 13, when a command associated with the second voice recognition engine is received through the microphone 802 while the first voice recognition engine 810 is being executed, the processor 870 may switch the driving mode of the vehicle from the manual driving mode to the autonomous driving mode.

In other words, when a command associated with the second voice recognition engine is received through the microphone 802 in the manual driving mode, the processor 870 may switch the driving mode of the vehicle from the manual driving mode to the autonomous driving mode.

In addition, the processor 870 may execute (activate) the second voice recognition engine 820 based on the reception of a command associated with the second voice recognition engine.

At this time, the first voice recognition engine 810 may enter an inactive state, may be off, or may enter a standby state.

Through this configuration, the present disclosure may provide a new vehicle control method capable of switching the driving mode of the vehicle according to the type of the voice recognition engine being executed.

On the other hand, the vehicle control apparatus according to the present disclosure may determine the type of speech recognition engine to be executed based on the switching of the driving mode of the vehicle.

When a function associated with the driving of the vehicle is carried out while an ADAS (Advanced Driver Assistance Systems) function is carried out, the processor 870 may activate (execute) the recognition engine 820 while performing the function associated with the driving of the vehicle.

The ADAS function may include all functions that can be carried out by ADAS. For example, the ADAS function may include a function that provides a warning to the driver, such as a forward collision warning (FCW) function, intelligent parking assist (IPA), autonomous emergency braking (AEB), and lane keep assist (LKA), and the like, and a function that controls the driving of the vehicle, and the like.

The processor 870 may execute the ADAS function even when the vehicle is driving in the manual driving mode. The ADAS function may be associated with a function executed according to a situation.

As illustrated in FIG. 14A, the processor 870 may perform a function associated with the driving of the vehicle among the ADAS functions based on the driving status of the vehicle while the vehicle is driving in the manual driving mode (in other words, while the first voice recognition engine 810 is being executed).

For example, when the possibility of collision with another vehicle located in front of the present vehicle is above a predetermined value (or the time to collusion (TTC) is less than a predetermined time based on a distance to the another vehicle and the speed of the present vehicle, the processor 870 may execute a function (e.g., an AEB function) associated with the driving of the vehicle among the ADAS functions.

Figure 14:
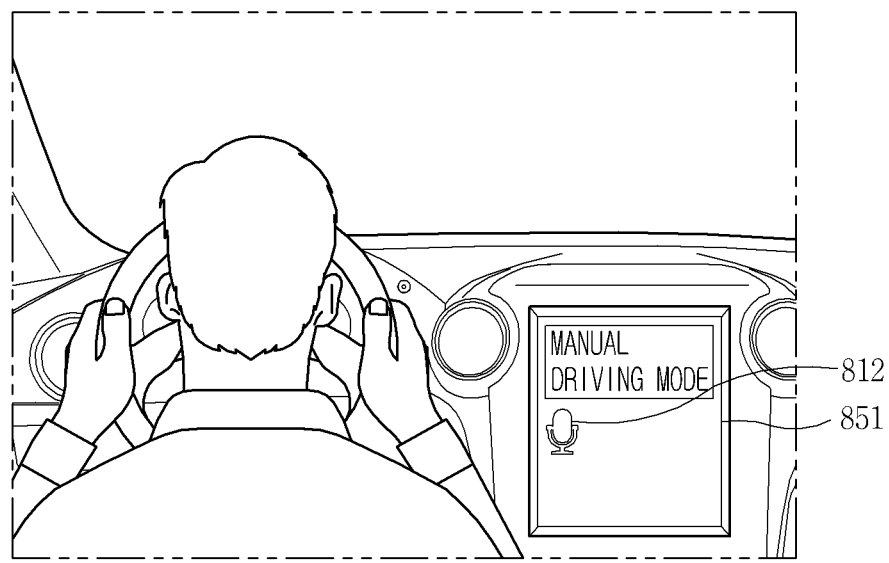
Figure 14:
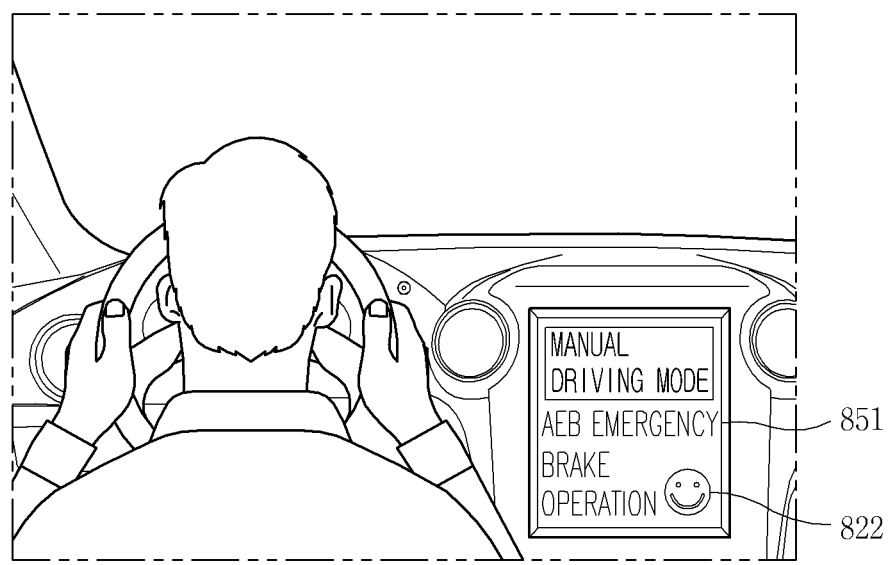

At this time, as illustrated in (b) of FIG. 14, the processor 870 may activate the second voice recognition engine 820 while a function associated with the driving of the vehicle is carried out.

In other words, the processor 870 may activate the second voice recognition engine 820 when sensing a situation in which a function associated with the driving of the vehicle is carried out. Then, the processor 870 may control the second voice recognition engine 820 to perform a function associated with the driving of the vehicle.

Performing a function associated with the driving of the vehicle among the ADAS functions may include allowing the vehicle being driven in the manual driving mode to temporarily perform autonomous driving.

Accordingly, the processor 870 of the present disclosure may activate the second voice recognition engine 820 to temporarily control the vehicle, and perform a function associated with the driving of the vehicle through the second voice recognition engine 820.

On the other hand, the present disclosure may provide the vehicle control device 800 including a first voice recognition engine and a second voice recognition engine disposed to have different guide information (guide messages) for the same function.

In detail, the first voice recognition engine 810 and the second voice recognition engine 820 may output different guide information for the same function differently.

The processor 870 may execute the same function (specific function) based on a command (the same command) received through the microphone 802. For example, the first voice recognition engine 810 and the second voice recognition engine 820 may execute the same function (specific function) in response to the command.

At this time, the processor 870 may control the first voice recognition engine 810 and the second voice recognition engine 820 to output different guidance information (guide messages, response performances, response types, etc.) even when the same function is carried out.

Figure 15:
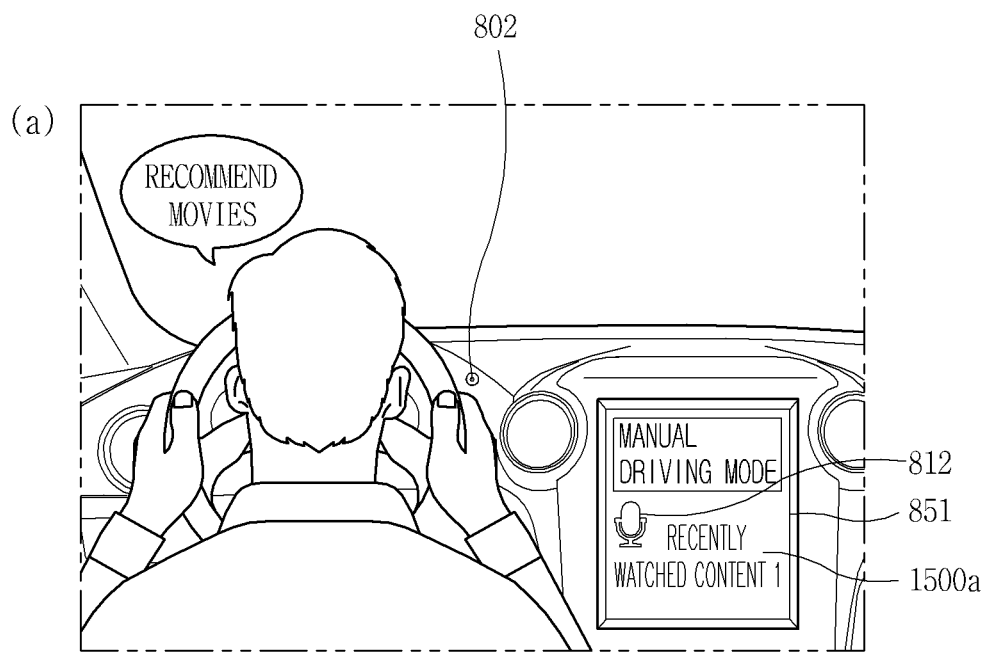
Figure 15:
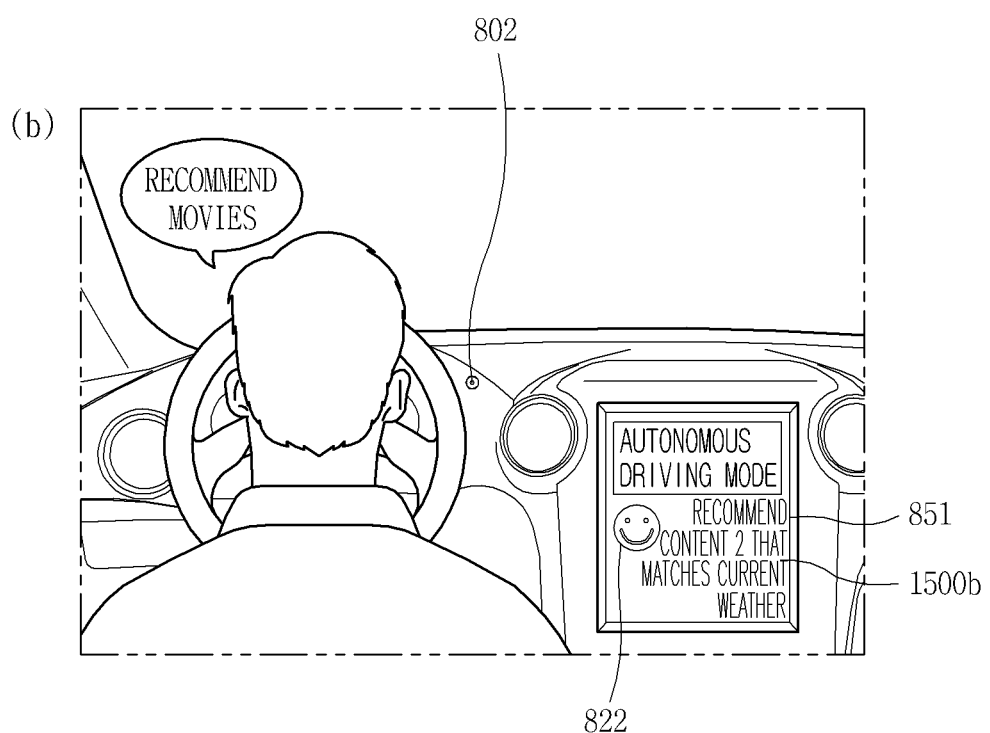

For example, as illustrated in (a) of FIG. 15, the processor 870 may execute the same function through the first voice recognition engine 810 in response to a command received through the microphone 802.

At this time, when the same function is executed through the first voice recognition engine 810, the processor 870 may output first guide information 1500*a* for the same function.

On the other hand, as illustrated in (a) of FIG. 15, the processor 870 may execute the same function through the first voice recognition engine 820 in response to a command received through the microphone 802.

At this time, when the same function is executed through the second voice recognition engine 820, the processor 870 may output second guide information 1500*b* different from the first guide information for the same function.

For an example, when the vehicle is being driven in the manual driving mode, the first voice recognition engine 810 may output concise guide information for the same function. On the other hand, when driving in the autonomous driving mode, the second voice recognition engine 820 may output guide information optimized to the driver for the same function.

As described above, the present disclosure may provide a new user interface capable of outputting different guide messages for the same function according to the driving mode of the vehicle even when the same function is carried out through the first and second voice recognition engines, thereby providing guide information to the driver in an optimized manner.

On the other hand, the vehicle control device 800 associated with the present disclosure may include the communication unit.

The communication unit may be the foregoing communication apparatus 400. The communication unit may be connected to communicate with a mobile terminal existing within the vehicle 100.

For an example, the vehicle control device 800 (or the vehicle 100) and the mobile terminal may be connected to enable wireless communication through the communication unit. When the vehicle control device 800 and the mobile terminal are connected in a wireless manner to enable mutual wireless communication at the user's request or have previously been connected to enable wireless communication, they may be connected in a wireless manner to enable mutual wireless communication based on the mobile terminal entering an inside of the vehicle.

The communication unit may be provided in the vehicle (or in the vehicle control device), or may be formed in a separate module form to enable communication (or electrical coupling) with the components of the vehicle.

The vehicle control device 800 may control the mobile terminal through the communication unit.

Specifically, the vehicle control device 800 may transmit a control signal for controlling the mobile terminal to the mobile terminal 900 through the communication unit. When the control signal is received, the mobile terminal may perform a function/operation/control corresponding to the control signal.

Conversely, the present disclosure may allow the mobile terminal 900 to control the vehicle control device 800 (or vehicle 100). Specifically, the mobile terminal may transmit a control signal for controlling the vehicle to the vehicle control device 800. In response to this, the vehicle control device 800 may perform a function/operation/control corresponding to the control signal transmitted from the mobile terminal.

On the other hand, when any command that is unresponsive in the first and second voice recognition engines 81, 820 is received through the microphone 802, the processor 870 may receive voice recognition information associated with the any command through the communication unit.

Any command that is unresponsive in the first and second voice recognition engines 810, 820 may denote a command other than commands that can be carried out in the first and second voice recognition engines 810, 820. In other words, the any command may be a command that is not stored in the memory 140.

When the any command and/or information on a function associated with the any command is not stored in the memory 140, the first and second voice recognition engines 810, 820 may not output any information in response to the any command. In this case, the first and second voice recognition engines 810, 820 may output guide information indicating that a function (or information) corresponding to the command cannot be executed through the output unit 850.

On the other hand, when a command that is unresponsive in the first and second voice recognition engines is received through the microphone 802, the processor 870 may receive voice recognition information associated with the any command through the communication unit.

The voice recognition information associated with the any command may include a function corresponding to the any command, a function associated with the any command, information associated with the any command or the like.

The processor 870 may receive voice recognition information associated with the any command through the communication unit. At this time, the processor 870 may receive voice recognition information associated with any one command from a mobile terminal, the Internet, or an external server connected to the communication unit.

Figure 16:
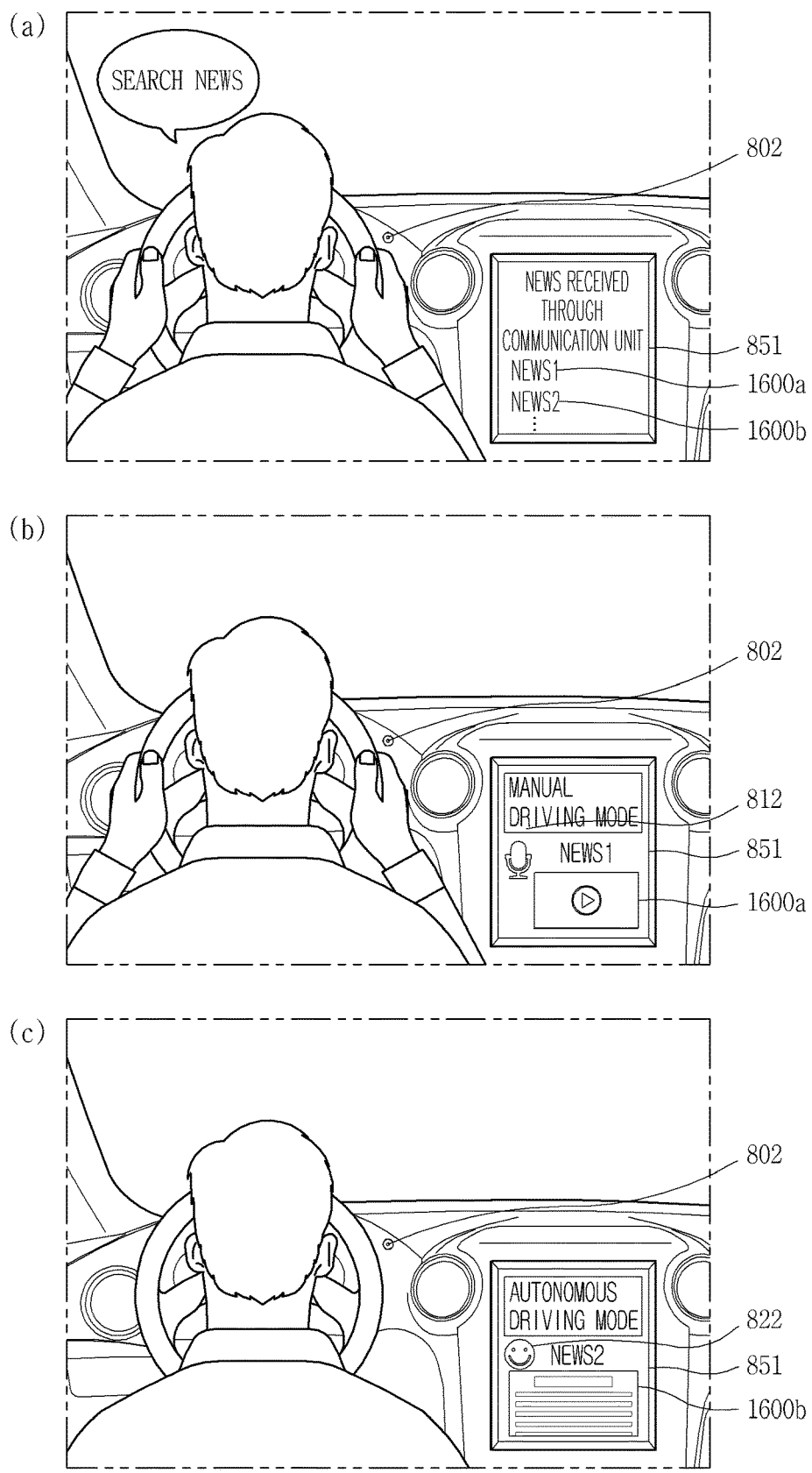

For example, as illustrated in (a) of FIG. 16, when a command that is unresponsive in the first and second voice recognition engines is received through the microphone 802, voice recognition information 1600*a*, 1600*b* associated with any command received through the communication unit may be output to the output unit 850.

The processor 870 may execute either one of the first and second voice recognition engines 810, 820 based on the type of the received voice recognition information. In addition, the executed voice recognition engine (the either one voice recognition engine) may output the received voice recognition information.

The voice recognition information received through the communication unit may be associated with information for identifying whether the voice recognition information should be executed in the first voice recognition engine or the second voice recognition engine.

Moreover, the voice recognition information received through the communication unit may be information associated with the driving of the vehicle.

In addition, the voice recognition information received through the communication unit may be associated with information for identifying whether the voice recognition information should be executed in the first control authority or the second control authority.

The processor 870 may execute either one of the first and second voice recognition engines 810, 820 based on the type of the received voice recognition information (i.e., whether the received voice recognition information is associated with information for the identification or information associated with the driving of the vehicle).

Then, the processor 870 may output the received voice recognition information through the output unit 850 through the executed voice recognition engine.

For example, when the type of the received voice recognition information is information associated to be executed in the first voice recognition engine 810, the processor 870 may execute the first voice recognition engine 810, and output the received voice recognition information 1600*a* through the output unit 850 using the first voice recognition engine 810 as illustrated in (b) of FIG. 16.

For example, when the type of the received voice recognition information is information associated to be executed in the second voice recognition engine 820 (or information associated with the driving of the vehicle), the processor 870 may execute the second voice recognition engine 820, and output the received voice recognition information 1600*b* through the output unit 850 using the second voice recognition engine 820 as illustrated in (c) of FIG. 16.

Furthermore, when the voice recognition information (e.g., 1600*b*) that should be carried out in the second voice recognition engine 820 is received while the driving mode of the vehicle is the manual driving mode, the processor 870 may switch the driving mode of the vehicle from the manual driving mode to the autonomous driving mode. In addition, the processor 870 may execute the second speech recognition engine 820 to output the speech recognition information.

The voice recognition information received through the communication unit may be executed in the first voice recognition engine 810 or may be executed (outputted) in the second voice recognition engine 810.

In this case, the processor 870 may output the received voice recognition information from either one of the first and second voice recognition engines based on the driving mode of the vehicle.

In other words, when the voice recognition information is received, the processor 870 may output the voice recognition information through either one of the first and second voice recognition engines based on the driving mode of the vehicle.

For example, when the driving mode of the vehicle is the manual driving mode, the processor 870 may execute the first voice recognition engine 810, and output the received voice recognition information through the first voice recognition engine 810.

For another example, when the driving mode of the vehicle is the autonomous driving mode, the processor 870 may execute the second voice recognition engine 820, and output the received voice recognition information through the second voice recognition engine 820.

Through this configuration, the present disclosure may provide a user interface capable of using the voice recognition engine in an optimized manner.

Hereinafter, various embodiments of using the first voice recognition engine or the second voice recognition engine for each situation will be described with reference to the accompanying drawings.

Figure 17:
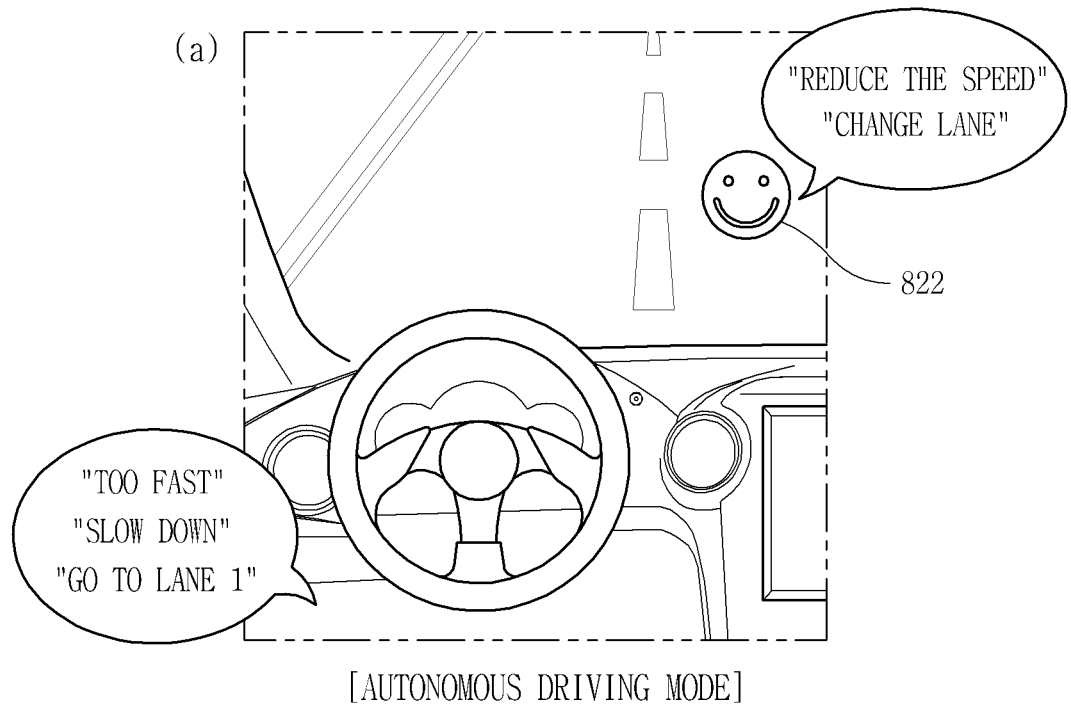
Figure 17:
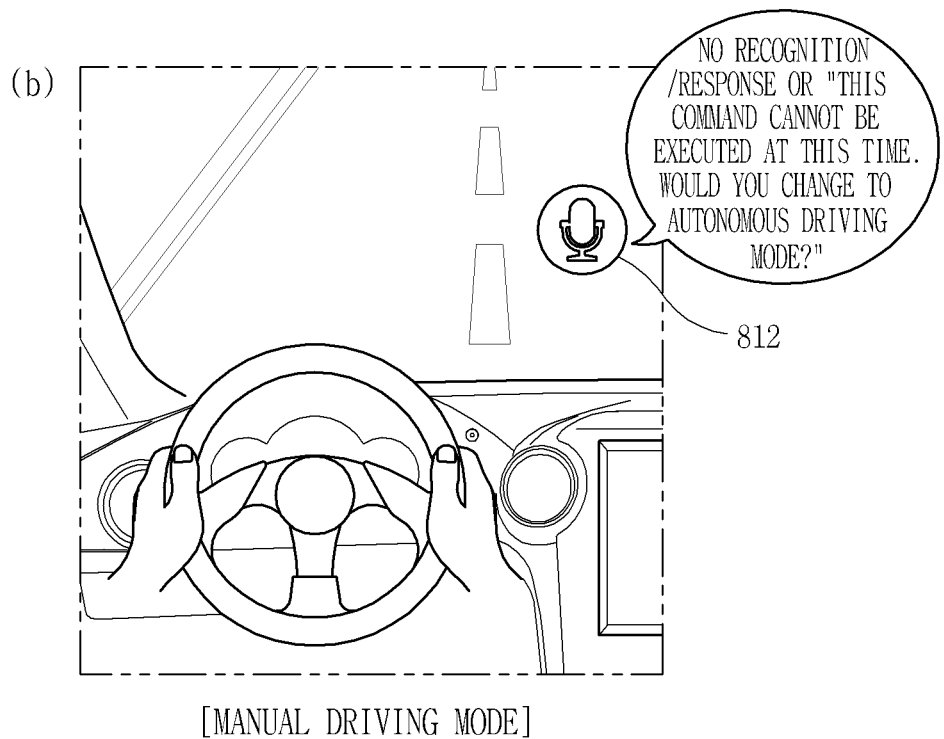

Referring to FIG. 17, the vehicle control device of the present disclosure may perform different functions based on the type of a command received through the microphone 802 and the current driving mode of the vehicle.

For example, as illustrated in (a) of FIG. 17, when the driving mode of the vehicle is the autonomous driving mode, the second voice recognition engine 820 may be being executed. At this time, when a command associated with with the driving of the vehicle is received through the microphone, the processor 870 may perform the driving of the vehicle corresponding to the command through the second voice recognition engine 820.

For another example, as illustrated in (b) of FIG. 17, when the driving mode of the vehicle is the manual driving mode, the first voice recognition engine 810 may be being executed. At this time, when a command associated with with the driving of the vehicle is received through the microphone, the processor 870 may output notification information indicating that a function corresponding to the command cannot be carried out through the first voice recognition engine 810.

In addition, the processor 870 may output a guide message inquiring whether or not to switch the driving mode of the vehicle in response to the received command associated with the vehicle, and then switch the driving mode of the vehicle from the manual driving mode to the autonomous driving mode in response to the user's command (e.g., yes).

In addition, when the driving mode of the vehicle is switched from the manual driving mode to the autonomous driving mode, the processor 870 may terminate the first voice recognition engine 810, and execute the second voice recognition engine 820.

The processor 870 may execute the voice recognition engine when the state of the vehicle is a preset state. For example, the processor 870 may execute the second voice recognition engine 820 instead of the first voice recognition engine 810, based on the preset state of the vehicle. In other words, according to the present disclosure, when the state of the vehicle is a preset state, the processor 870 may first execute the voice recognition engine, and give a warning to the driver, instead of executing the voice recognition engine in response to the user's command.

Here, the preset state may be a situation that is dangerous to the operation of the vehicle or a situation that is dangerous to the driver.

Figure 18:
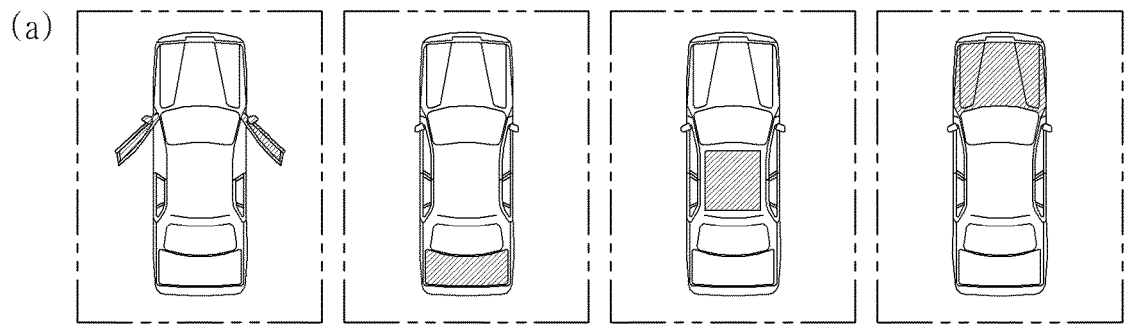
Figure 18:
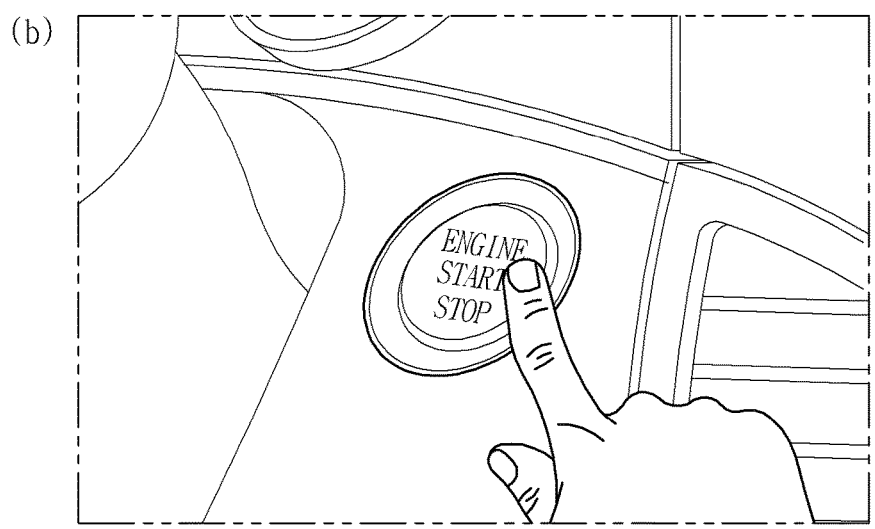
Figure 18:
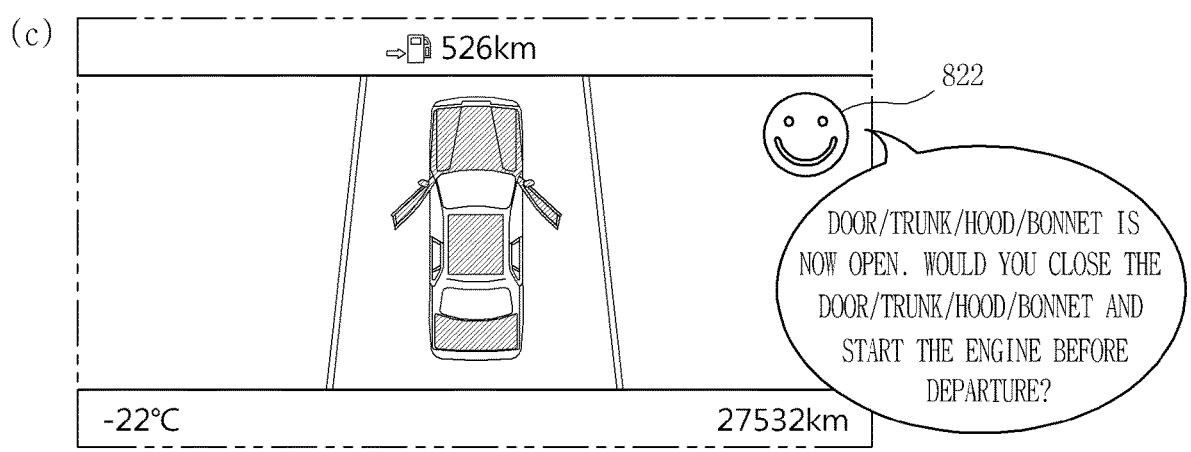

For example, as illustrated in FIG. 18, the processor 870 may execute the voice recognition engine (e.g., second voice recognition engine) when the start button of the vehicle is pressed while the door or window of the vehicle is open.

Then, the processor 870 may output information indicating the operation of the vehicle capable of releasing the preset state, and perform the operation of the vehicle in response to a command received through the microphone.

At this time, since the preset state is associated with the driving of the vehicle, the processor 870 may execute the second voice recognition engine 820 other than the first voice recognition engine 810, and release the preset state through the executed second recognition engine 820.

On the other hand, when the preset state is not associated with the driving of the vehicle, the processor 870 may execute the first voice recognition engine 810.

Figure 19:
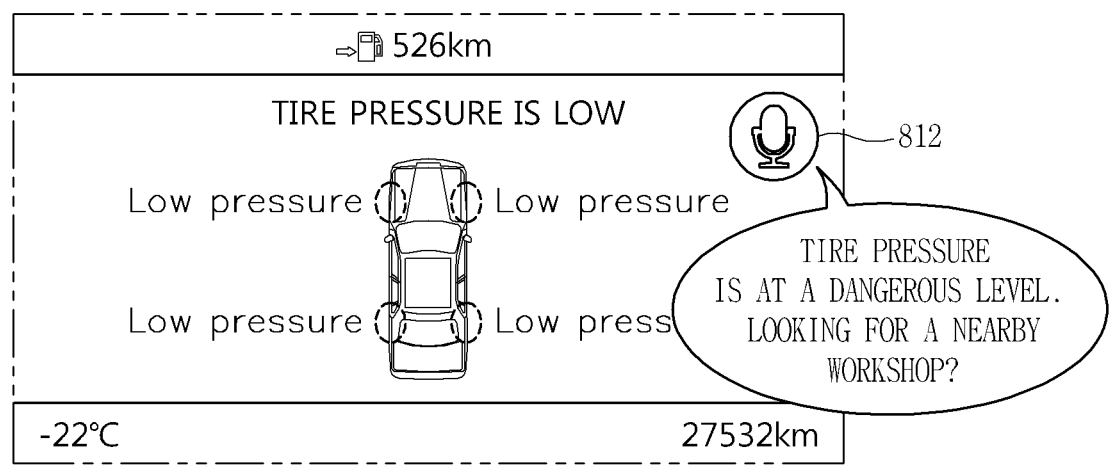
Figure 19:
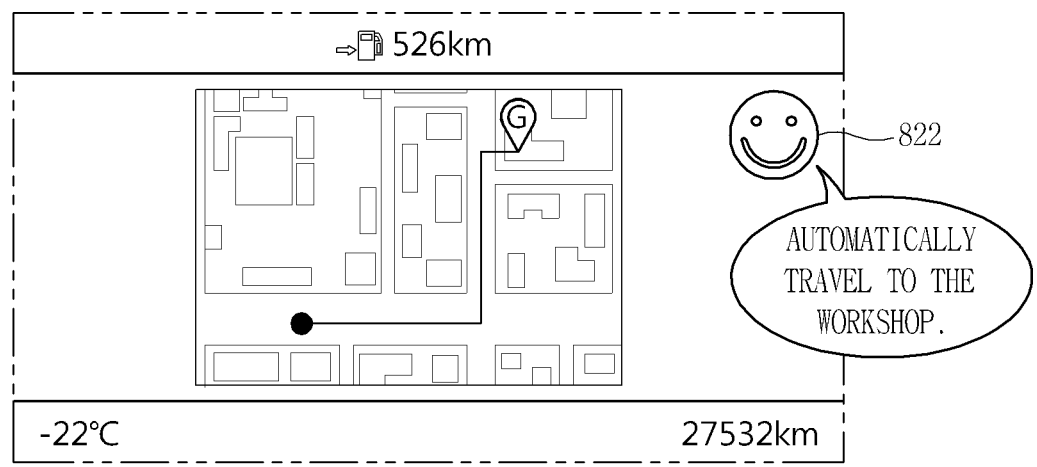

For example, as illustrated in (a) of FIG. 19, when a tire air pressure measured by the tire pressure system (TPS)

function after the vehicle is started is lower than a reference value (i.e., when the preset state is not associated with the driving of the vehicle), the processor 870 may execute the first voice recognition engine 810.

Then, the processor 870 may output information inquiring whether or not to search for path information leading to a repair shop through the first voice recognition engine 810.

Then, the processor 870 may set the path information, and set the driving mode of the vehicle to the autonomous driving mode in response to a command received through the microphone. In this case, as illustrated in (b) of FIG. 19, the processor 870 may terminate the first voice recognition engine 810 being executed, and execute the second voice recognition engine 820. Then, the processor 870 may drive the vehicle in the autonomous driving mode through the second voice recognition engine 820.

Figure 20:
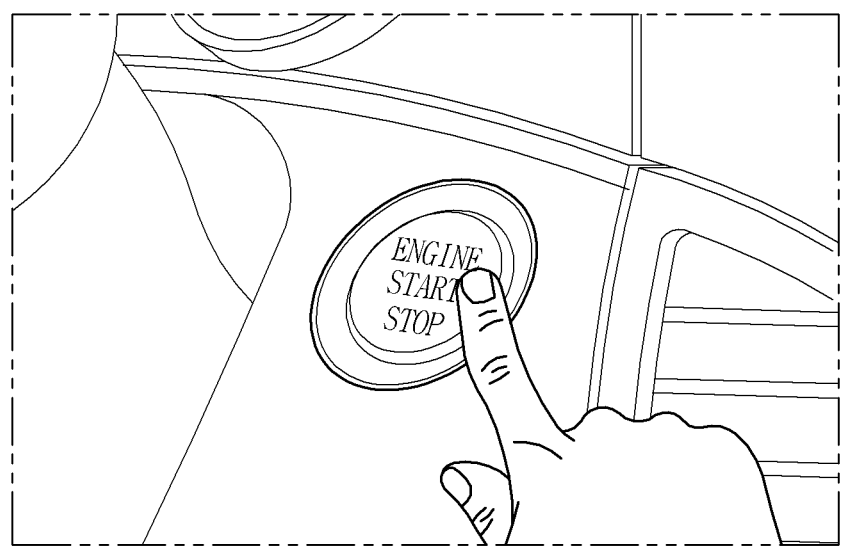
Figure 20:
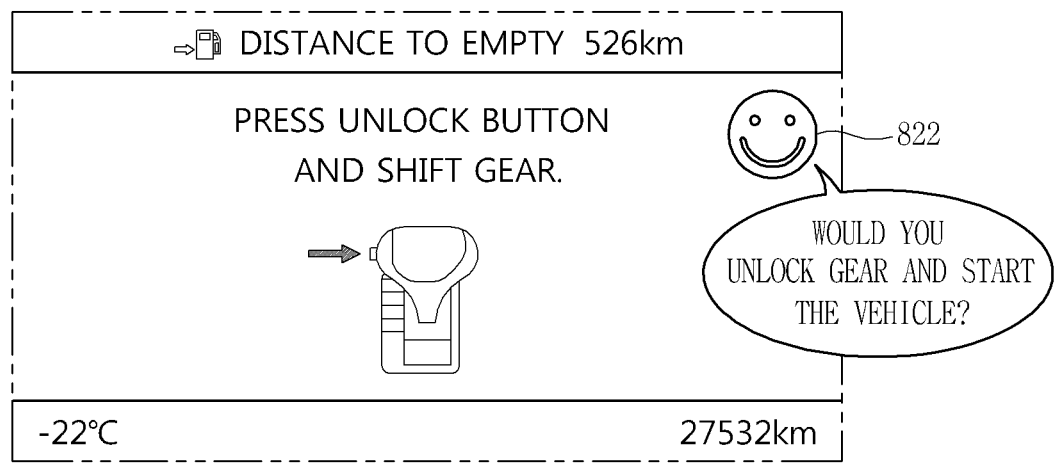

Meanwhile, as illustrated in FIG. 20, the preset state may include a case where an operation of changing the gear of the vehicle is sensed, but the gear is not changed (e.g., when the driver's intention of operation is sensed).

In this case, the processor 870 may execute a voice recognition engine (e.g., the second voice recognition engine 820) even when a command is not received through the microphone. Then, the processor 870 may output guide information for notifying the problem of the driver's operation or guide information inquiring whether or not to execute a function corresponding to the driver's intention of operation through the voice recognition engine.

Then, the processor 870 may perform a function corresponding to the driver's intention of operation through the voice recognition engine (e.g., the second voice recognition engine 820) in response to the received command.

Meanwhile, the first voice recognition engine according to the present disclosure may suggest the driver to switch to the autonomous driving mode, and switch the driving mode of the vehicle in response to a user command.

Figure 21:
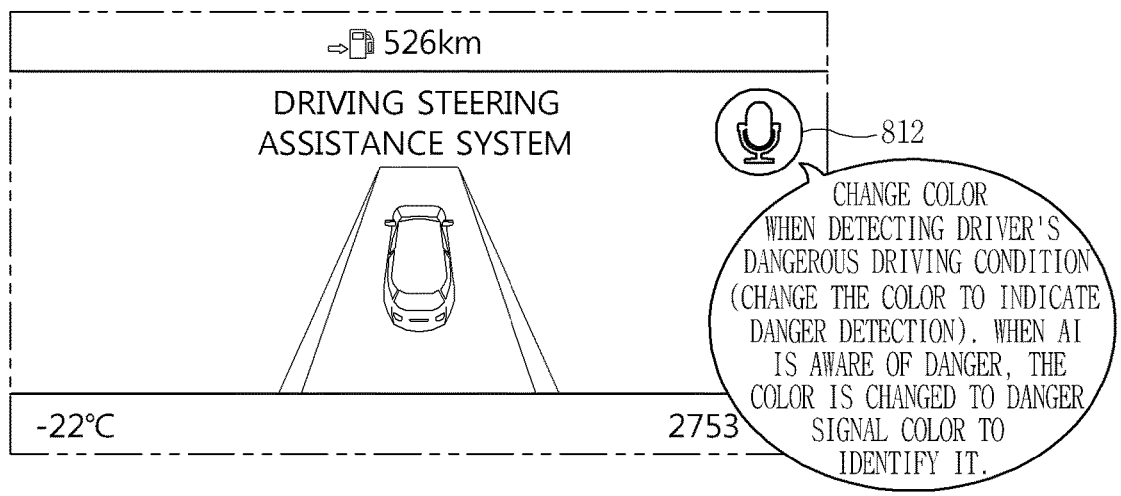
Figure 21:
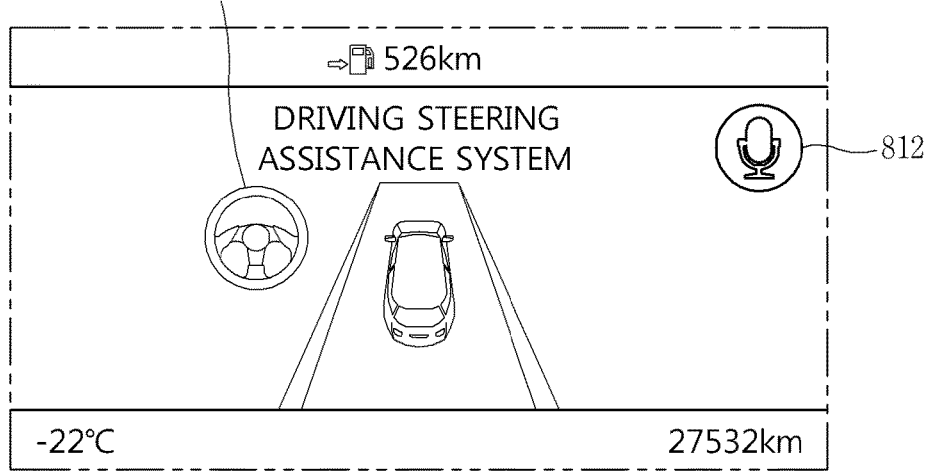
Figure 21:
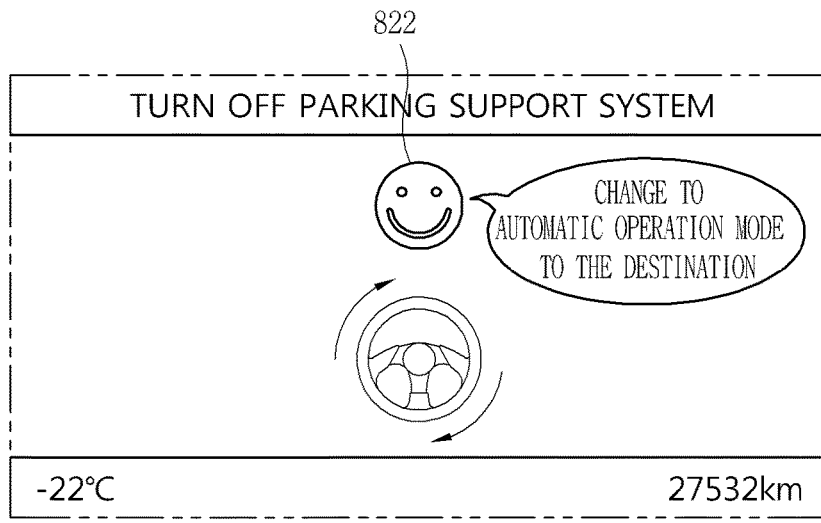

For example, as illustrated in (a) of FIG. 21, the processor 870 may determine the driving state of the vehicle while the driving mode of the vehicle is the manual driving mode. At this time, when the driving state of the vehicle corresponds to a preset condition (e.g., when the possibility of collision is greater than a predetermined value), the processor 870 may change the display method of the first graphic object 812 corresponding to the first voice recognition engine.

Here, the preset condition may include a case where the driving state of the vehicle is a dangerous state.

For example, when the driving state of the vehicle corresponds to a preset condition, the processor 870 may periodically change the color of the first graphic object (or change the preset condition until it is released), or blink the first graphic object 812.

When the driving state of the vehicle corresponds to a preset condition, the processor 870 may output guide information inquiring whether or not to switch the driving mode of the vehicle to the autonomous driving mode through the first voice recognition engine 810. have.

In addition, the processor 870 may display an icon 2000 for recommending to switch to the autonomous driving mode on the display module 851.

Then, when a command to switch the driving mode of the vehicle to the autonomous driving mode is received through the microphone, the processor 870 may switch the driving mode of the vehicle from the manual driving mode to the autonomous driving mode as illustrated in (c) of FIG. 21.

Based on the change of the driving mode of the vehicle from the manual driving mode to the autonomous driving mode, the first voice recognition engine may be terminated, and the second voice recognition engine may be executed (i.e., the first voice recognition engine may be switched to the second voice recognition engine).

On the other hand, the processor 870 may have a case where the driving state of the vehicle corresponds to a specific condition among preset conditions.

Here, the specific condition may correspond to a condition for urgently performing the control of the vehicle.

For example, the condition of urgently performing the control of the vehicle may be a case where the possibility of collision is greater than a threshold value or when the driver's state is a specific state (e.g., fainting, shock, drowsiness, etc.).

Figure 22:
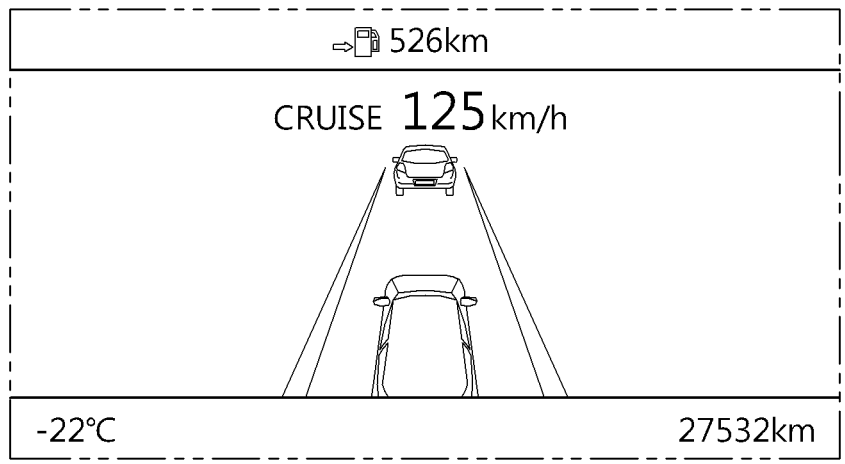
Figure 22:
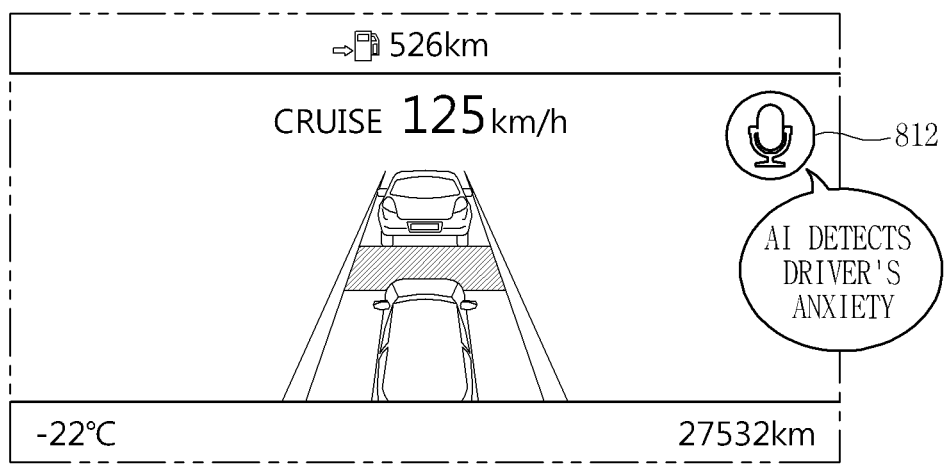
Figure 22:
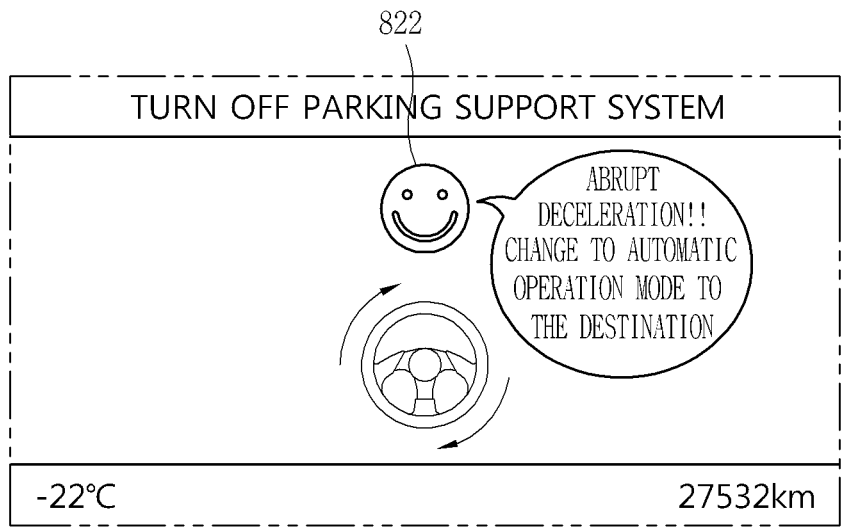

When the driving state of the vehicle being driven in the manual driving mode becomes the preset condition, the processor 870 may execute the first voice recognition engine 810 as illustrated in (b) of FIG. 22, and control the display method of the first graphic object 812 corresponding to the first voice recognition engine 810 through the display module 851.

At this time, when the driving state of the vehicle corresponds to the specific condition among the preset conditions, the processor 870 may switch the driving mode of the vehicle from the manual driving mode to the autonomous driving mode even when an additional command is not received as illustrated in (c) of FIG. 22.

In addition, the processor 870 may terminate the first voice recognition engine, execute the second voice recognition engine, and autonomously drive the vehicle through the second voice recognition engine based on the switching to the autonomous driving mode.

According to an embodiment of the present disclosure, there are one or more following effects.

First, the present disclosure may provide a new user interface capable of executing a different voice recognition engine for each driving mode of a vehicle, thereby controlling the vehicle in an optimized manner.

Second, the present disclosure may provide a new control method of a vehicle capable of switching the driving mode of the vehicle according to a voice recognition engine being executed among the plurality of voice recognition engines.

Third, the present disclosure may execute an optimized voice recognition engine according to a situation, and control a vehicle in an optimized manner through the voice recognition engine, thereby significantly improving the convenience of a driver.

The effects of the present disclosure may not be limited to the above-mentioned effects, and other effects not mentioned herein may be clearly understood by those skilled in the art from the description of the claims.

The vehicle control device 800 described above may be included in the vehicle 100.

Furthermore, the operation or control method of the vehicle control device 800 described above will be analogically applied to the operation or control method of the vehicle 100 (or controller 170) in the same or similar manner.

For example, the control method of the vehicle 100 (or the control method of the vehicle control device 800) may include receiving a command through a microphone, and executing either one of a first voice recognition engine and a second voice recognition engine based on the driving mode of the vehicle when the command is received through the microphone.

A more specific embodiment will be substituted by the earlier description, or will be analogically applied thereto in the same or similar manner.

Each of the above steps may be carried out not only by the vehicle control device 800 but also by the controller 170 provided in the vehicle 100.

Furthermore, all functions, configurations, or control methods carried out by the foregoing vehicle control device 800 may be carried out by the controller 170 provided in the vehicle 100. In other words, all the control methods described in this specification may be applied to a control method of a vehicle or a control method of a control device.

Moreover, all functions, configurations, or control methods carried out by the vehicle control device 800 described above may be carried out by the controller of the mobile terminal. In addition, all the control methods described in this specification will be analogically applied to a control method of a mobile terminal in the same or similar manner.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control device comprising:
   a microphone;
   a processor; and
   a memory device storing a first voice recognition engine, and
   a second voice recognition engine different from the first voice recognition engine, the memory device further storing instructions that, when executed, cause the processor to
   execute operations comprising:
      determining a driving mode of a vehicle at the time that a command is received through the microphone; and
      executing one of the first and second voice recognition engines based on the driving mode of the vehicle.

2. The vehicle control device of claim 1, wherein the operations comprise:
   based on determining the driving mode of the vehicle is a manual driving mode at the time that the command is received, executing the first voice recognition engine in response to the received command; and
   based on determining the driving mode of the vehicle is an autonomous driving mode at the time that the command is received, executing the second voice recognition engine in response to the received command.

3. The vehicle control device of claim 1, wherein the first voice recognition engine and the second voice recognition engine are set to have different control authorities for controlling the vehicle.

4. The vehicle control device of claim 3, wherein the different control authorities include a first control authority and a second control authority,
   wherein the first voice recognition engine is set with the first control authority, and the second voice recognition engine is set with second control authority that permits more control functionalities than the first control authority.

5. The vehicle control device of claim 4, wherein the first voice recognition engine is configured to disable controlling of driving of the vehicle based on the first control authority, and the second voice recognition engine is configured to enable controlling of the driving of the vehicle based on the second control authority.

6. The vehicle control device of claim 1, wherein the processor is configured to control the first and second voice recognition engines to execute different functions in response to a same command received through the microphone.

7. The vehicle control device of claim 6, wherein the first voice recognition engine is configured to execute a first function associated with a vehicle in response to the same command, and the second voice recognition engine is configured to execute a second function associated with the vehicle in response to the same command, the second function being different from the first function.

8. The vehicle control device of claim 1, wherein the operations comprise:
   determining that a command associated with the second voice recognition engine is received through the microphone while the first voice recognition engine is being executed; and
   switching the driving mode of the vehicle from a manual driving mode to an autonomous driving mode.

9. The vehicle control device of claim 1, wherein the operations comprise:
   determining that a function associated with driving of the vehicle is performed among ADAS (Advanced Driver Assistance Systems) functions, while the vehicle is operated in the manual driving mode; and
   activating the second voice recognition engine while the function associated with the driving of the vehicle is performed.

10. The vehicle control device of claim 1, wherein the first voice recognition engine and the second voice recognition engine are configured to output different guide information for the same function.

11. The vehicle control device of claim 1, further comprising:
    a communication unit,
    wherein the operations comprise:
       determining that a command is received through the microphone, wherein the first and second voice recognition engines are incapable of processing the command; and
       receiving voice recognition information associated with the command through the communication unit.

12. The voice recognition engine of claim 11, wherein the operations comprise:
    determining a type of the received voice recognition information; and
    executing one of the first and second voice recognition engines based on the type of the received voice recognition information,
    wherein the executed one of the first and second voice recognition engines is configured to output the received voice recognition information.

13. The vehicle control device of claim 12, wherein the operations comprise:

determining that voice recognition information associated with the second voice recognition engine is received while the driving mode of the vehicle is the manual driving mode;

changing the driving mode of the vehicle from the manual driving mode to an autonomous driving mode; and executing the second voice recognition engine to output the voice recognition information.

14. The vehicle control device of claim 11, wherein the operations comprise:

determining that the voice recognition information is received;

determining one of the first and second voice recognition engines based on the driving mode of the vehicle; and outputting the voice recognition information using the one of the first and second voice recognition engines.

15. A vehicle comprising:

a vehicle control device comprising:
 a microphone;
 a processor; and
 a memory device storing a first voice recognition engine, and a second voice recognition engine different from the first voice recognition engine, the memory device further storing instructions that, when executed, cause the processor to execute operations comprising:
  determining a driving mode of a vehicle when a command is received through the microphone; and
  executing either one of the first and second voice recognition engines based on the driving mode of the vehicle.

16. A method of controlling a vehicle, the method comprising:

receiving a command through a microphone;

determining a drive mode of the vehicle when the command is received; and executing one of a first voice recognition engine and a second voice recognition engine based on the driving mode of the vehicle.

17. The method of claim 16, further comprising:

based on determining the driving mode of the vehicle is a manual driving mode at the time that the command is received, executing the first voice recognition engine in response to the received command; and based on determining the driving mode of the vehicle is an autonomous driving mode at the time that the command is received, executing the second voice recognition engine in response to the received command.

18. The method of claim 16, wherein the first voice recognition engine and the second voice recognition engine are set to have different control authorities for controlling the vehicle.

19. The vehicle of claim 15, wherein the operations comprises:

based on determining the driving mode of the vehicle is a manual driving mode at the time that the command is received, executing the first voice recognition engine in response to the received command; and based on determining the driving mode of the vehicle is an autonomous driving mode at the time that the command is received, executing the second voice recognition engine in response to the received command.

20. The vehicle of claim 15, wherein the first voice recognition engine and the second voice recognition engine are set to have different control authorities for controlling the vehicle.

* * * * *